United States Patent
Liu et al.

(10) Patent No.: US 11,157,478 B2
(45) Date of Patent: Oct. 26, 2021

(54) TECHNIQUE OF COMPREHENSIVELY SUPPORT AUTONOMOUS JSON DOCUMENT OBJECT (AJD) CLOUD SERVICE

(71) Applicant: Oracle International Corporation, Redwood Shores, CA (US)

(72) Inventors: Zhen Hua Liu, San Mateo, CA (US); Vikas Arora, Burlingame, CA (US); Ying Lu, Sunnyvale, CA (US); Sriram Krishnamurthy, San Francisco, CA (US); Hui Joe Chang, San Jose, CA (US); Beda Christoph Hammerschmidt, Los Gatos, CA (US); Joshua Jeffrey Spiegel, St. Louis, MO (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/690,817

(22) Filed: Nov. 21, 2019

(65) Prior Publication Data

US 2020/0210398 A1 Jul. 2, 2020

Related U.S. Application Data

(60) Provisional application No. 62/786,170, filed on Dec. 28, 2018.

(51) Int. Cl.
*G06F 7/00* (2006.01)
*G06F 16/22* (2019.01)
(Continued)

(52) U.S. Cl.
CPC ...... *G06F 16/2272* (2019.01); *G06F 16/2246* (2019.01); *G06F 16/2255* (2019.01);
(Continued)

(58) Field of Classification Search
CPC ............... G06F 16/282; G06F 16/2246; G06F 16/2272; G06F 16/24558; G06F 16/284
(Continued)

(56) References Cited

U.S. PATENT DOCUMENTS 5,255,356 A 10/1993 Michelman et al.
5,265,246 A 11/1993 Li
(Continued)

FOREIGN PATENT DOCUMENTS

CN 108052320 A 5/2018
EP 2 608 072 A1 6/2013
(Continued)

OTHER PUBLICATIONS

Truica et al., "CRUD Operations in MongoDB", International Conference on Advanced Computer Science and Electronics Information (ICACSEI 2013), dated 2013, 4 pages.
(Continued)

*Primary Examiner* — Md I Uddin
(74) *Attorney, Agent, or Firm* — Hickman Becker Bingham Ledesma LLP

(57) ABSTRACT

The present invention relates to autonomous tuning of a data grid of documents in a database. Herein are techniques for storage cells to autonomously maintain local indices and other optimization metadata and algorithms to accelerate selective access into a distributed collection of documents. In an embodiment, each storage cell persists a respective subset of documents. Each storage cell stores, in memory, respective index(es) that map each item to location(s), in one or more documents of the respective subset of documents, where the item occurs. One or more computers execute, based on at least a subset of the indices of the storage cells, a data access request from a database management system. In an embodiment, a cloud of JSON document services
(Continued)

provides an easy-to-use, fully autonomous JSON document database that horizontally and elastically scales to deliver fast execution of document transactions and queries without needing tuning by a database administrator.

18 Claims, 8 Drawing Sheets

(51) Int. Cl.
  *G06F 16/2455* (2019.01)
  *G06F 16/28* (2019.01)

(52) U.S. Cl.
  CPC .. *G06F 16/24552* (2019.01); *G06F 16/24558* (2019.01); *G06F 16/282* (2019.01); *G06F 16/284* (2019.01)

(58) Field of Classification Search
  USPC ................................ 707/715, 770, 999.204
  See application file for complete search history.

(56) References Cited

U.S. PATENT DOCUMENTS

| | | | |
|---|---|---|---|
| 5,551,027 | A | 8/1996 | Choy et al. |
| 5,819,255 | A | 10/1998 | Celis |
| 5,848,408 | A | 12/1998 | Jakobsson et al. |
| 5,943,689 | A | 8/1999 | Tamer |
| 5,987,453 | A | 11/1999 | Krishna et al. |
| 5,999,943 | A | 12/1999 | Nori et al. |
| 6,233,575 | B1 | 5/2001 | Agrawal et al. |
| 6,507,846 | B1 | 1/2003 | Consens |
| 6,611,843 | B1 | 8/2003 | Jacobs |
| 6,618,729 | B1 | 9/2003 | Bhashyam et al. |
| 6,665,684 | B2 | 12/2003 | Zait et al. |
| 6,836,778 | B2 | 12/2004 | Manikutty |
| 6,957,210 | B1 | 10/2005 | Ramesh |
| 6,957,222 | B1 | 10/2005 | Ramesh |
| 7,031,994 | B2 | 4/2006 | Lao et al. |
| 7,092,954 | B1 | 8/2006 | Ramesh |
| 7,219,102 | B2 | 5/2007 | Zhou |
| 7,231,387 | B2 | 6/2007 | Sauermann et al. |
| 7,272,589 | B1 | 9/2007 | Guay |
| 7,454,435 | B2 | 11/2008 | Friedman |
| 7,493,305 | B2 | 2/2009 | Thusoo |
| 7,496,589 | B1 | 2/2009 | Jain et al. |
| 7,516,121 | B2 | 4/2009 | Liu et al. |
| 7,644,014 | B2 | 1/2010 | Viswanath |
| 7,836,066 | B2 | 11/2010 | Chang et al. |
| 7,877,400 | B1 | 1/2011 | Matthew |
| 7,913,241 | B2 | 3/2011 | Liu et al. |
| 8,032,499 | B2 | 10/2011 | Faerber et al. |
| 8,203,972 | B2 | 6/2012 | Sauermann |
| 8,392,382 | B2 | 3/2013 | Marwah et al. |
| 8,578,261 | B1 | 11/2013 | Gupta |
| 8,583,692 | B2 | 11/2013 | Ganesh |
| 8,612,487 | B2 | 12/2013 | Hui |
| 8,645,337 | B2 | 2/2014 | Kapoor et al. |
| 8,832,142 | B2 | 9/2014 | Marwah et al. |
| 9,292,564 | B2 | 3/2016 | Kamp et al. |
| 9,659,045 | B2 | 5/2017 | Liu et al. |
| 10,333,709 | B2 | 6/2019 | Dictos |
| 2002/0059287 | A1 | 5/2002 | Karasudani |
| 2003/0115324 | A1 | 6/2003 | Blumenau et al. |
| 2004/0033803 | A1 | 2/2004 | Varonen et al. |
| 2004/0103105 | A1 | 5/2004 | Lindblad |
| 2004/0117396 | A1 | 6/2004 | Avadhanam et al. |
| 2005/0044089 | A1 | 2/2005 | Wu |
| 2005/0055334 | A1 | 3/2005 | Krishnamurthy |
| 2005/0055355 | A1 | 3/2005 | Murthy et al. |
| 2005/0086267 | A1 | 4/2005 | Avadhanam et al. |
| 2005/0086520 | A1 | 4/2005 | Dharmapurikar et al. |
| 2005/0268171 | A1 | 12/2005 | House et al. |
| 2005/0283458 | A1 | 12/2005 | Galindo-Legaria |
| 2006/0020616 | A1 | 1/2006 | Hardy |
| 2006/0031233 | A1 | 2/2006 | Liu |
| 2006/0047719 | A1* | 3/2006 | Hershkovich ....... G06F 16/2272 |
| 2006/0224551 | A1 | 10/2006 | Lariba-Pey |
| 2007/0078914 | A1 | 4/2007 | Corral |
| 2007/0124415 | A1 | 5/2007 | Lev-Ran et al. |
| 2007/0239681 | A1 | 10/2007 | Krishnaprasad |
| 2007/0250517 | A1 | 10/2007 | Bestgen |
| 2007/0255748 | A1 | 11/2007 | Ferragina |
| 2008/0010256 | A1 | 1/2008 | Lindblad |
| 2008/0065596 | A1 | 3/2008 | Shadmon |
| 2008/0104283 | A1 | 5/2008 | Shin et al. |
| 2008/0155229 | A1 | 6/2008 | Beyer et al. |
| 2008/0189303 | A1 | 8/2008 | Bush et al. |
| 2008/0235479 | A1 | 9/2008 | Scales |
| 2008/0281784 | A1 | 11/2008 | Zane et al. |
| 2008/0320019 | A1 | 12/2008 | Bireley |
| 2009/0063538 | A1 | 3/2009 | Chitrapura |
| 2009/0307241 | A1 | 12/2009 | Schimunek et al. |
| 2010/0070448 | A1 | 3/2010 | Omoigui |
| 2010/0077107 | A1 | 3/2010 | Lee et al. |
| 2010/0122026 | A1 | 5/2010 | Umamageswaran |
| 2010/0161567 | A1 | 6/2010 | Makela |
| 2010/0235347 | A1 | 9/2010 | Chaudhuri |
| 2010/0325169 | A1 | 12/2010 | Loh |
| 2011/0016157 | A1 | 1/2011 | Bear et al. |
| 2011/0029569 | A1 | 2/2011 | Ganesh et al. |
| 2011/0066791 | A1 | 3/2011 | Goyal |
| 2011/0113036 | A1 | 5/2011 | Idicula et al. |
| 2011/0137940 | A1 | 6/2011 | Gradin et al. |
| 2011/0191522 | A1 | 8/2011 | Condict |
| 2011/0208774 | A1 | 8/2011 | Breining |
| 2011/0289118 | A1 | 11/2011 | Chen |
| 2012/0036133 | A1 | 2/2012 | Chen et al. |
| 2012/0117038 | A1 | 5/2012 | Ganesh et al. |
| 2012/0144234 | A1 | 6/2012 | Clark et al. |
| 2012/0173515 | A1 | 7/2012 | Chanho et al. |
| 2012/0173774 | A1 | 7/2012 | Lee |
| 2012/0221604 | A1 | 8/2012 | Gao |
| 2012/0296883 | A1 | 11/2012 | Ganesh |
| 2013/0159278 | A1 | 6/2013 | Liu et al. |
| 2014/0032615 | A1 | 1/2014 | Hammerschmidt et al. |
| 2014/0095519 | A1 | 4/2014 | Liu |
| 2014/0281247 | A1 | 9/2014 | Loaiza et al. |
| 2015/0039587 | A1 | 2/2015 | Liu et al. |
| 2015/0058337 | A1 | 2/2015 | Gordon |
| 2015/0089138 | A1 | 3/2015 | Tao et al. |
| 2015/0134670 | A1 | 5/2015 | Liu et al. |
| 2015/0149479 | A1 | 5/2015 | Geringer et al. |
| 2015/0347512 | A1 | 12/2015 | Luo |
| 2016/0294651 | A1 | 10/2016 | Renna |
| 2016/0321375 | A1 | 11/2016 | Liu et al. |
| 2017/0017683 | A1 | 1/2017 | Fourny et al. |
| 2017/0060912 | A1 | 3/2017 | Liu |
| 2017/0060973 | A1 | 3/2017 | Liu et al. |
| 2017/0103092 | A1 | 4/2017 | Hu et al. |
| 2017/0103094 | A1 | 4/2017 | Hu et al. |
| 2017/0103116 | A1 | 4/2017 | Hu et al. |
| 2017/0345428 | A1* | 11/2017 | Chen .................... G06F 1/1632 |
| 2018/0067853 | A1 | 3/2018 | Mukherjee et al. |
| 2020/0117736 | A9 | 4/2020 | Hammerschmidt |
| 2021/0081389 | A1 | 3/2021 | Liu et al. |

FOREIGN PATENT DOCUMENTS

| | | |
|---|---|---|
| WO | WO 03/107222 A1 | 12/2003 |
| WO | WO 03/107222 A1 | 12/2003 |
| WO | WO 2008/091705 A2 | 7/2008 |
| WO | WO 2012/032184 A1 | 3/2012 |
| WO | WO2015/017724 A1 | 2/2015 |
| WO | WO 2015/041967 A1 | 3/2015 |
| WO | WO 2015/069941 | 5/2015 |
| WO | WO 2015/069941 A1 | 5/2015 |
| WO | WO 2017/062288 A1 | 4/2017 |

OTHER PUBLICATIONS

The PartiQL Specification Committee, "PartiQL Specification", dated Aug. 1, 2019, 48 pages.

(56) References Cited

OTHER PUBLICATIONS

Modern SQL, "What's New in SQL", dated Jun. 15, 2017, 19 pages.
Khan et al., "SQL Support Over Mongo DB Using Metadata", International Journal of Scientific and Research Publications, vol. 3, Issue 10, dated Oct. 2013, 5 pages.
IMB, "BSON and JSON Built-in Opaque Data Types", https://www.ibm.com/support/knowledgecenter/en/SSGU8G_12.1.0/com.ibm.sqls.doc/ids_sqs_1770.htm, last viewed on Jun. 18, 2020, 9 pages.
Cai et al., "Integrated Querying of SQL database data and S3 data in Amazon Redshift", IEEE, dated 2018, 9 pages.
Boicea et al., "MongoDB vs Oracle—database comparison", dated Sep. 2012, 7 pages.
Arora et al., "Modeling and Querying Data in Mongo DB", International Journal of Scientific & Engineering Research, vol. 4, Issue 7, Jul.-2013, 4 pages.
Amazon Ion, "Doc/Specification", http://amzn.github.io/ion-docs/docs/spec.html, dated Aug. 20, 2019, 13 pages.
Liu, U.S. Appl. No. 14/337,189, filed Jul. 21, 2014, Interview Summary, dated Feb. 16, 2017.
Chavan, U.S. Appl. No. 15/146,798, filed May 4, 2016, Interview Summary, dated Jan. 24, 2019.
Loaiza, U.S. Appl. No. 13/840,811, filed Mar. 15, 2013, Final Office Action, dated Jul. 5, 2017.
Liu, U.S. Appl. No. 14/337,189, filed Jul. 21, 2014, Office Action, dated Nov. 13, 2017.
Liu, U.S. Appl. No. 15/162,235, filed May 23, 2016, Office Action, dated May 3, 2018.
Liu, U.S. Appl. No. 15/162,235, filed May 23, 2016, Notice of Allowance, dated Jul. 1, 2019.
Liu, U.S. Appl. No. 15/162,235, filed May 23, 2016, Final Office Action, dated Oct. 2, 2018.
Liu, U.S. Appl. No. 14/836,680, filed Aug. 26, 2015, Office Action, dated Apr. 18, 2018.
Liu, U.S. Appl. No. 14/836,680, filed Aug. 26, 2015, Notice of Allowance, dated Nov. 21, 2018.
Loaiza, U.S. Appl. No. 13/840,811, filed Mar. 15, 2013, Interview Summary, dated Apr. 10, 2018.
Liu, U.S. Appl. No. 14/337,189, filed Jul. 21, 2014, Office Action, dated Dec. 28, 2018.
Loaiza, U.S. Appl. No. 13/840,811, filed Mar. 15, 2013, Interview Summary, dated Oct. 18, 2017.
Liu, U.S. Appl. No. 14/337,189, filed Jul. 21, 2014, Interview Summary, dated Feb. 14, 2018.
Liu, U.S. Appl. No. 14/337,189, filed Jul. 21, 2014, Final Office Action, dated Aug. 28, 2019.
Liu, U.S. Appl. No. 14/337,189, filed Jul. 21, 2014, Final Office Action, dated Jun. 6, 2018.
Liu, U.S. Appl. No. 14/337,189, filed Jul. 21, 2014, Final Office Action, dated Jan. 20, 2017.
Liu, U.S. Appl. No. 14/337,189, filed Jul. 21, 2014, Advisory Action, dated Mar. 22, 2017.
Liu U.S. Appl. No. 14/699,685, filed Apr. 29, 2015, Notice of Allowance, dated Apr. 24, 2017.
Chavan, U.S. Appl. No. 15/146,798, filed May 4, 2016, Office Action, dated Oct. 19, 2018.
Chavan, U.S. Appl. No. 15/146,798, filed May 4, 2016, Notice of Allowance, dated Mar. 27, 2019.
Liu, U.S. Appl. No. 14/699,685, filed Apr. 29, 2015, Notice of Allowance, dated Aug. 22, 2017.
U.S. Appl. No. 12/562,984, filed Sep. 18, 2009, Final Office Action, dated Aug. 23, 2012.
U.S. Appl. No. 14/498,893, filed Sep. 26, 2014, Notice of Allowance, dated Jan. 13, 2017.
U.S. Appl. No. 14/337,189, filed Jul. 21, 2016, Interview Summary, dated Oct. 21, 2016.
U.S. Appl. No. 14/337,189, filed Jul. 21, 2014, Office Action, dated Jul. 28, 2016.
U.S. Appl. No. 13/840,811, filed Mar. 15, 2013, Office Action, dated Jan. 12, 2015.
U.S. Appl. No. 13/840,811, filed Mar. 15, 2013, Interview Summary, dated Apr. 27, 2015.
U.S. Appl. No. 13/840,811, filed Mar. 15, 2013, Interview Summary, dated Apr. 5, 2016.
U.S. Appl. No. 13/840,811, filed Mar. 15, 2013, Final Office Action, dated Dec. 21, 2015.
U.S. Appl. No. 13/840,811, filed Mar. 15, 2013, Final Office Action, dated Jul. 15, 2015.
Loaiza, US Appl. No. 13/840,811, filed Mar. 15, 2013, Interview Summary, dated Mar. 30, 2017.
U.S. Appl. No. 12/562,984, filed Sep. 18, 2009, Office Action, dated Jan. 27, 2012.
U.S. Appl. No. 14/498,893, filed Sep. 26, 2014, Office Action, dated Aug. 12, 2016.
U.S. Appl. No. 12/562,984, filed Sep. 18, 2009, Final Office Action, dated Nov. 20, 2013.
U.S. Appl. No. 12/562,984, filed Sep. 18, 2009, Office Action, dated Jun. 18, 2013.
Lui, U.S. Appl. No. 15/162,235, filed May 23, 2016, Interview Summary, dated Oct. 2, 2018.
Loaiza, U.S. Appl. No. 13/840,811, filed Mar. 15, 2013, Office Action, dated Jan. 10, 2018.
Loaiza, U.S. Appl. No. 13/840,811, filed Mar. 15, 2013, Office Action, dated Dec. 15, 2016.
Loaiza, U.S. Appl. No. 13/840,811, filed Mar. 15, 2013, Notice of Allowance, dated Jun. 7, 2018.
Loaiza, U.S. Appl. No. 13/840,811, filed Mar. 15, 2013, Notice of Allowance, dated Jan. 9, 2019.
U.S. Appl. No. 12/562,984, filed Sep. 18, 2009, Restriction Requirement, dated Aug. 23, 2012.
Hammerschmidt, Beda, "JSON Generation: to quote or not to quote, that is the question, JSON in the Oracle Database", Blogs. Oracle, dated Aug. 8, 2017, 6 pages.
Bloom, Burton H. (1970), "Space/time trade-offs in hash coding with allowable errors", Communications of the ACM 13 (7): 422-426.
Abello et al., "Data Warehousing, Handbook of Massive Datasets", dated Apr. 1, 2002, Springer, 4 pages.
Furtak et al., "Using SIMD Registers and Instructions to Enable Instruction-Level Parallelism in Sorting Algorithms", ACM Symposium on Parallel Algorithms and Architectures, dated 2007, 10 pages.
Elmasri, et al., "Fundatmentals of Database Systems," Third Edition, Addison-Wesley Longman, 2000, pp. 32, 70, 118, 131-132, 134, 155-159, 170, 252-254, 558, 569-573, 591-592, and 789-790 (26 pgs).
Dittrich et al., "Towards a One Size Fits All Database Architecture" Proceedings of the 5th Biennial Conference on Innovative Data Systems Research, dated Jan. 6, 2011, 4 pages.
Dharmapurikar, Sarang, et al., Deep Packet Inspection using Parallel Bloom Filters,<http://www.arl.wustl.edu/~sarang/27_dharmapurikar_s_updated.pdf>, retrieved on Oct. 28, 2005, 8 pages.
D.E. Knuth, "The Art of Computer Programming", vol. 3: 2nd Edition Sorting and Searching, ISBN: 0-201-03803-X, pp. 129-157 from book, dated 1973.
Haw et al., "Data Storage Practices and Query Processing in XML Databases: Asurvery", Knowlesge-Based Systems, vol. 24, Issue, 8 dated Dec. 2011, pp. 1317-1340.
Candillier et al., "Mining XML Documents In: Data Mining Patterns: New Methods and Applications", dated Nov. 19, 2007, IGI Global, 28 pages.
Kleppmann et al., "A Conflict-Free Replicated JSON Datatype", dated Aug. 15, 2017, 17 pages.
Beomseok Nam et al., "Spatial Indexing of Distributed Multidimensional Datasets", Cluster Computing and the Grid, dated 2005, 8 pages.
Bamford, Roger et al., "Xquery Reloaded", Proceedings of the VLDB Endowment 2.2 dated 2009, pp. 1342-1353.
Bacon, Jean, "Naming Distributed Systems", dated Feb. 2, 2010, 28 pages.
Anonymous: "Part VIII JSON", In: "Oracle XML DB Developer's Guide 12c Release 1 (12.1)", dated Dec. 1, 2016, 46 pages.

(56) References Cited

OTHER PUBLICATIONS

Anonymous: "Oracle Database JSON Developers Guide 12c Release 2 (12.2)", dated Aug. 1, 2017, 196 pages.
Anonymous: "Oracle Database In-Memory: Powering the Real-Time Enterprise", dated Dec. 31, 2014, 9 pages.
Ailamaki, Anastassia, et al., "Weaving Relations for Cache Performance," Proceedings of the 27th International Conference on Very Large Data Bases, Rome, Italy, Sep. 11-14, 2001, 14 pages.
Chasseur et al., "Enabling JSON Document Stores in Relational Systems", WebDB dated 2013, New York, New York, USA, 16 pages.
Oracle Database, "Introduction to Simple Oracle Document Access (SODA)", 18c E86033-04, dated Aug. 2018, 96 pages.
Wikipedia, the free encyclopedia, "BSON", last viewed on Dec. 28, 2015, https://en.wikipedia.org/wiki/BSON, 3 pages.
Wikipedia, the free encyclopedia, "Apache Avro", https://en.wikipedia.org/wiki/Apache_Avro, last viewed on Dec. 28, 2015, 2 pages.
W3Schools "SQL Update Statement", Wayback Machine darted Apr. 19, 2012, on the internet www.w3schools.com/sql/sql_update.asp>, 1 page.
Theobald et al., "TopX: Efficient and Versatile Top-K Query Processing for Semistructured Data", The VLDB Journal, vol. 17 issue, dated Jan. 1, 2008, pp. 81-115.
Tekli et al., "XML Document-Grammer Comparison: Related Problems and Applications", Central European Journal of Computer Science, vol. 1, dated 2011, 14 pages.
Shukla et al., "Schema-Agnostic Indexing with Azure DocumentDB", Proceedings of the VLDB Endowment, vol. 8, No. 12, Copyright 2015 VLDB, 12 pages.
Graefe et al., "Hash joins and hash teams in Microsoft SQL server," 1998. Proceedings of the 24th VLDB Conference New York, USA, pp. 87-90.
Roth et al., "Don't' Scrap It Wrap it!, A Wrapper Architecture for Legacy Data Sources", Proceedings of the International Conference on Very Largedata Bases, dated Aug. 26, 1997, 10 pages.
Wikipedia, the free encyclopedia, "Protocol Buffers", last viewed on Dec. 28, 2015, https://en.wikipedia.org/wiki/Protocol_Buffers, 3 pages.
Mostarda et al., "MU: An Hybrid Language for Web Mashups", International World Wide Web Conference, Madrid, Spain, dated 2009, 10 pages.

Microsoft, "Database Instant File Initialization", SQL Server 2016, https://msdn.microsoft.com/en-US/library/ms175935.aspx, 3 pages.
Michael et al., Improving Distributed Join Efficiency With Extended Bloom Filter Operations, dated 2007, AMC.
Liu et al., "Ad-heap: an Efficient Heap Data Structure for Asymmetric Multicore Processors", In Proceedings of Workshop on General Purpose Processing Using GPUs, ACM, dated 2014, 10 pages.
Liu et al., "A Decade of XML Data Management: An Industrial Experience Report from Oracle", IEEE, dated 2009, 12 pages.
Li et al., "Closing the functional and Performance Gap between SQL and NoSQL", ACM 978-1-4503-3531-7, dated Jun. 26, 2016, 12 pages.
LaMarca et al., "The Influence of Caches on the Performance of Heaps", dated Jan. 1, 1996, 26 pages.
Schaffner et al., "A Hybrid Row-Column OLTP Database Architecture for Operational Reporting", dated Aug. 24, 2008, 14 pages.
Zhou et al., "Implementing Database Operations Using SIMD Instructions", Proceedings of the ACM Sigmod International Conference on Management of Data, dated Jun. 3, 2002, pp. 145-156.
McHugh et al., "Lore: A Database Management System for Semistructured Data", Sigmod, vol. 26 No. 3, dated Sep. 3, 1997, 14 pages.
Liu et al., "Ad-Heap", General Purpose Processing Using GPUS, ACM, 2 Penn Plaza 701 New Yorkm NY, USA, dated Mar. 1, 2014, pp. 54-63.
Oracle Database, "Oracle Database JSON Developer's Guide", 21c F30948-01, dated Nov. 2020, 305 pages.
Hammerschmidt, Beda, "The new SQL/JSON Query operators (Part5: JSON_TABLE, Nested Path, Ordinality Column)", JSON in the Oracle Database, dated May 18, 2015, 7 pages.
Hammerschmidt, U.S. Appl. No. 15/993,438, filed May 30, 2018, Final Rejection, dated Jul. 28, 2021.
Hammerschmidt, U.S. Appl. No. 15/993,438, filed May 30, 2018, Office Action, dated Apr. 21, 2021.
Hammerschmidt, U.S. Appl. No. 15/993,438, filed May 30, 2018, Office Action, dated Mar. 19, 2020.
Hammerschmidt, U.S. Appl. No. 15/993,438, filed May 30, 2018, Final Office Action, dated Oct. 15, 2020.
Hammerschmidt, U.S. Appl. No. 15/993,438, filed May 30, 2018, Advisory Action, dated Dec. 17, 2020.

\* cited by examiner

TECHNIQUE OF COMPREHENSIVELY SUPPORT AUTONOMOUS JSON DOCUMENT OBJECT (AJD) CLOUD SERVICE

RELATED CASES; BENEFIT CLAIM

This application claims the benefit of Provisional Appln. 62/786,170, filed Dec. 28, 2018 the entire contents of which is hereby incorporated by reference as if fully set forth herein, under 35 U.S.C. § 119(e). The following cases are related and are each incorporated herein by reference in entirety.
- U.S. Pat. No. 10,262,012, Techniques Related to Binary Encoding of Hierarchical Data Objects to Support Efficient Path Navigation of the Hierarchical Data Objects, filed by Zhen Hua Liu, et al. on Aug. 26, 2015;
- U.S. Pat. No. 8,825,678, Hash Join Using Collaborative Parallel Filtering In Intelligent Storage With Offloaded Bloom Filters, filed by Dmitry Potapov, et al. on Sep. 18, 2009;
- U.S. Pat. No. 10,296,462, Method To Accelerate Queries Using Dynamically Generated Alternate Data Formats In Flash Cache, filed by Juan Loaiza, et al. on Mar. 15, 2013;
- U.S. patent application Ser. No. 16/022,465, Techniques for Enabling and Integrating In-Memory Semi-Structured Data and Text Document Searches With In-Memory Columnar Query Processing, filed by Zhen Hua Liu, et al. on Jun. 28, 2018;
- U.S. Pat. No. 9,864,816, Dynamically Updating Data Guide For Hierarchical Data Objects, filed by Zhen Hua Liu, et al., on Apr. 29, 2015;
- U.S. patent application Ser. No. 16/144,926, On-Demand Cache Management of Derived Cache, filed by Hariharan Lakshmanan, et al., on Sep. 27, 2018;
- U.S. patent application Ser. No. 14/337,189, entitled Generic SQL Enhancement To Query Any Semi-Structured Data And Techniques To Efficiently Support Such Enhancements, filed by Zhen Hua Liu, et al. on Jul. 21, 2014;
- U.S. patent application Ser. No. 15/146,798, Tracking and Maintaining Expression Statistics Across Database Queries, filed by Shasank K. Chavan, et al. on May 4, 2016.

The following non-patent literature (NPL) are related and incorporated herein by reference in entirety.
- Oracle Database, Introduction to Simple Oracle Document Access (SODA), 18C, E86033-04, August 2018;
- Closing the functional and Performance Gap between SQL and NoSQL, SIGMOD '16 Proceedings of the 2016 International Conference on Management of Data, pages 227-238, Jun. 26, 2016.

FIELD OF THE INVENTION

The present invention relates to autonomous tuning of a data grid of documents. Herein are techniques for storage cells to autonomously maintain storage-side indices and other optimization metadata and algorithms to accelerate selective access into a distributed collection of hierarchical data objects.

BACKGROUND

JavaScript object notation (JSON) may be used as a schema-less semi-structured document object model (DOM) for application development. Application objects may be persisted as JSON using a simple put/get/replace style CRUD (create, read, update, delete) application program interface (API) over a document collection store. Once a JSON document store is populated with content, the document store should also support online analytical processing (OLAP) over JDOM for complex reporting queries over JSON documents. Under a relational model, DBAs support OLAP by creating indices, materialized views, and/or loading data into memory to accelerate reporting queries.

A problem with state of the art document clouds is unsatisfactory performance for both OLTP JDOM and OLAP JDOM workloads, especially for a mix of both, and especially for a fluctuating ratio of the two. Application developers manually create desired indices for OLAP JDOM services. Whereas, for running both OLTP and OLAP JDOM, developers would prefer to minimize but not necessarily eliminate indexing, a preference which conflicts with state of the art document cloud stores that index everything or nothing by default in an attempt to accelerate one of OLAP or OLTP universally but inevitably and drastically slows down the other. It is a challenging, tedious, and error prone process to manually provide a solution that addresses both OLTP and OLAP JDOM operations in a cloud-store system.

DETAILED DESCRIPTION

Figure 1:
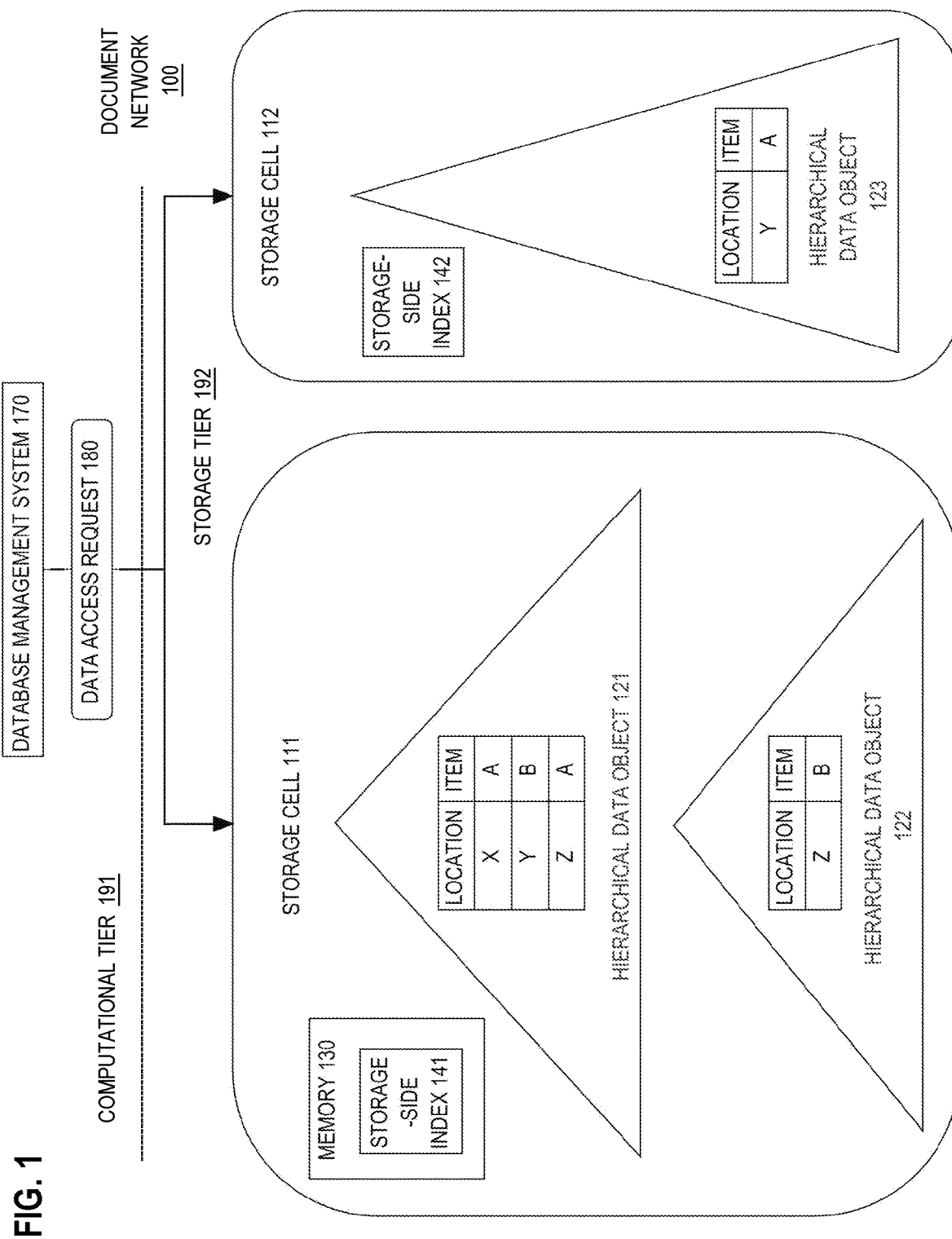
FIG. 1 is a block diagram that depicts an example document network that uses autonomous and storage-side indices to accelerate selective access into a distributed collection of hierarchical data objects.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Described herein are approaches that provide autonomous performance enhancements for both OLTP and OLAP JDOM operation services in the cloud without exposing to application developers the details of those performance enhancements. Such performance enhancements may include storage-side indexing, materialized views, and in-memory scans. Application developers need only use more logical concepts such as document collections, CRUD calls, query by example (QBE) calls, expressed through simple Oracle document access (SODA) APIs. SODA is described in a related manual, Oracle Database, Introduction to Simple Oracle Document Access. How SODA APIs are executed efficiently in the backend may be crucial. A logical interface may be provided instead of exposing physical implementation details to application developers.

Solutions herein may operate as any of: a database management system (DBMS) such as a relational DBMS (RDBMS), a data warehouse, and/or a data grid. Solutions herein comprise a computational tier and a storage tier, and each tier may contain one or more computers of a general or special purpose design. Computers in the storage tier are referred to as storage cells. Unlike other storage cells that are typically passive, storage cells herein may examine stored content, maintain metadata of content and/or usage such as storage-side indices and statistics, and autonomously manage such metadata and related optimization structures.

The computational tier may host an RDBMS. The storage tier may operate as a backend that provides the RDBMS with datastore/storage-side services such as persistence, filtration, indexing, and/or caching. The computational tier may have its own filtration, indexing, and caching based on implementations that are more or less dissimilar from those of the storage tier.

Herein, an autonomous data warehouse provides services for OLAP over a relational model, OLTP over the relational model, and can even provide both OLTP and OLAP services over either a JSON document object model (JDOM) in document collections as well as a full-fledged relational model with arbitrary tables and queries over the same persistent data.

SODA is an easy to use API to access JSON documents stored in JSON collections. From the perspective of developers dealing with a document store, the concept of a document collection may sometimes be more natural than a relational table, the concept of JSON documents may sometimes be more natural than rows, and the concept of QBE may sometimes be more natural than SQL. An embodiment may forbid various structured query language (SQL) data definition language (DDL) commands, especially table DDL command, to prevent users from adding arbitrary tables into a system. SODA API autonomously creates tables with proper JSON document columns and other house-keeping columns in response to a user's SODA request to create a document collection. There need be no direct DML statements issued by user applications over tables storing JSON documents. Instead, a SODA document CRUD API, that includes calls such as put( )/get( )/replace( ), comprise an interface for users to request OLTP JDOM services. The SODA CRUD API implementation autonomously generates proper SQL DML statements to perform insert/select/update/delete operation of JSON documents over JSON document storage tables in a database, including autonomous creation of a storage-side primary key index over the JSON document collection table for fast key-value lookup. SODA QBE API enables users to pose queries over a JSON document collection as a way to request OLAP JDOM services. The SODA QBE API implementation turns QBE into SQL/JSON statements that can be efficiently executed.

SODA OLAP over JDOM through relational views access is a powerful mechanism for users to bridge the relational model and JDOM model. However, instead of exposing JSON_TABLE( ) view creation directly, SODA provides JSON data guide generation APIs and relational views over JSON collections generation APIs. The imposition of a materialized or non-materialized database view according to techniques herein facilitates extraordinarily efficient participation by storage cells without impacting storage cell design.

The storage-side indices and other storage cell optimizations presented herein may improve the performance of filtering, projecting, and/or joining that are implementation operations that can support mechanisms of a database view. Even though a database view exists and operates in a DBMS, some or all of such implementation operations may be seamlessly delegated (i.e. pushed down) to an intelligent storage tier, without the storage tier having any awareness of database views or relational databases. For example, a database view may expose only important documents, and importance filtration can be delegated to the storage tier. Thus, a database view may achieve a mapping between documents and a relational table. Depending on the embodiment, the mapping may be bi-directional (i.e. a writable view), or only from documents to view table (i.e. read only).

SODA provides the same API for popular client programming languages. In general, automation of SODA techniques provides high-level interfaces and avoids use of SQL implementation details so that a document cloud can continuously and autonomously improve its own distributed performance according to techniques herein.

In an embodiment, each storage cell persists a respective subset of hierarchical data objects. Each storage cell stores, in memory, respective storage-side index(es) that map each item to location(s), in one or more hierarchical data objects of the respective subset of hierarchical data objects, where the item occurs. One or more computers execute, based on at least a subset of the storage-side indices of the storage cells, a data access request.

In an embodiment, a cloud of JSON document services provides an easy-to-use, fully autonomous JSON document database that horizontally and elastically scales to deliver fast execution of document transactions and queries without needing tuning by a database administrator (DBA).

1.0 Example Document Network

FIG. 1 is a block diagram that depicts an example document network 100, in an embodiment. Document network 100 uses autonomous and local storage-side indices to accelerate selective access into a distributed collection of hierarchical data objects.

Document network 100 comprises a communication network, such as a telephony and/or computer network, such as a local area network (LAN), wide area network (WAN), storage area network (SAN), or an internetwork of multiple networks of various such types. Document network 100 may comprise a distributed topology that contains architectural tiers 191-192. Computational tier 191 may be a middleware tier that contains database management system (DBMS) 170, such as a relational DBMS (RDBMS), that contains at least one database.

Storage tier 192 may operate as a durable datastore (i.e. backend) for DBMS 170, such as a data grid or a storage area network (SAN). Document network 100 interconnects multiple storage cells, such as 111-112, that are network elements of document network 100, and DBMS 170 that comprises at least one networked computer. For example, storage cells 111-112 may reside in a same or different data centers.

Each compute, such as a DBMS host or storage cells 111-112, of document network 100 may be a rack server such as a blade, a personal computer, a mainframe, a virtual computer, or other computing device. Storage cells 111-112 instead may each be a storage appliance or storage device, such as network attached storage (NAS), that contains memory, durable storage, and at least one processor such as a central processing unit (CPU) or a microcontroller. Each of storage cells 111-112 contains a memory such as 130.

Memory 130 may be a random access memory (RAM) or a block oriented memory such as a solid state drive (SSD). Memory 130 may be volatile or non-volatile. Each of storage cells 111-112 contains a durable storage medium that may include memory 130 and/or mechanical storage such as a disk drive or tape drive. If the durable storage medium and memory 130 are separate components, than memory 130 typically has less latency and less capacity than the durable storage medium.

In an embodiment, some or all of the data stored in memory 130 is eventually replicated into the durable storage medium. For example, memory 130 may operate as a mirror of metadata such as a durable storage-side index, and/or operate as a demand-driven cache according to a policy such as least recently used (LRU). Memory 130 may also store metadata that is not mirrored, such as a local and/or temporary storage-side index. Indeed, storage-side index creation and/or lifespan may be correlated to as few as a single data access request.

Document network 100 may persist many hierarchical data objects such as 121-123. Each of storage cells 111-112 may persist its own subset of hierarchical data objects 121-123. For example, storage cell 111 does not store hierarchical data object 123. Although not shown, a same hierarchical data object may be replicated on some or all storage cells.

In various embodiments, each of hierarchical data objects 121-123 may be an entirely or more or less self-contained hierarchical arrangement of data, such as a document. Each of hierarchical data objects 121-123 may contain JavaScript object notation (JSON), extensible markup language (XML), and/or key-value pairs. For example, hierarchical data objects 121-123 may have a multipurpose internet mail extensions (MIME) type and/or be capable of transfer/serialization as text. Binary formatting is discussed later herein.

In operation, DBMS 170 may receive or generate database statements (not shown), such as data manipulation language (DML), such as structured query language (SQL). Example scenarios include read only data warehousing, such as multidimensional online analytical processing (OLAP), or live business processing such as online transaction procession (OLTP). Indeed, DBMS 170 may endure antagonistic workloads, such as a mix of OLAP and OLTP that would stress known solutions as discussed later herein.

For example, state of the art approaches for accommodating both OLAP and OLTP use separate respective databases and/or database architectures even when OLAP and OLTP access same business data. With the state of the art, segregation of OLAP from OLTP into separate DBMSs facilitates separate tuning for OLAP and OLTP. With the state of the art, tuning for OLAP and OLTP in a same DBMS may be ineffective because of the divergent characteristics and antagonistic side effects of OLAP and OLTP workloads.

For example, an enterprise may use DynamoDB or MongoDB for OLTP and CosmosDB for OLAP. Whereas, autonomous performance approaches herein can optimally process both OLAP and OLTP in a same database of a same DBMS. Counterintuitively, techniques herein may seem to add internal complexity to a DBMS, but instead actually simplify database administration such as by: a) facilitating consolidation of OLAP and OLTP into a same database, and b) replacing tedious and error prone manual tuning with more effective alternatives herein such as autonomous behaviors and intelligent default configuration settings for JSON.

Antagonistic workloads are types of workloads that degrade each other's performance. For example, an OLAP query fills a buffer cache with data blocks needed for that query but not other queries that that will be executed within the short term. Thus, the cache has been filled data blocks unlikely to produce cache hits, but has been evicted of data blocks for an OLTP workloads which are far more likely to produce cache hits. Antagonistic types of workloads are also types of workload for which measures that performance of one type workload degrades performance of another type.

For example, more indices may improve OLAP workload but degrade OLTP workloads, which bear the overhead of updating indexes when a database is modified. As discussed later herein, autonomous techniques herein may adjust a distribution of work between a first computer that hosts a DBMS and a second computer that persists database data for the DBMS, such as according to whether work is dynamically detected to be part of an OLAP workload or part of an OLTP workload. For example, storage side indices are discussed elsewhere herein.

DBMS 170 may be multi-instance (i.e. distributed). In an embodiment not shown, computational tier 191 contains multiple DBMSs such as 170. For example, storage cell 111 may concurrently interoperate with multiple DBMSs that do not share content, which may be another antagonistic scenario.

DBMS 170 may execute each received database statement. Such execution may entail optimizations such as query planning. A generated query plan may specify at least one data access request, such as 180, to read and/or write data stored in storage cells 111-112.

For example, same data access request 180 may be sent to one, some, or all of storage cells 111-112 access one, some, or all of hierarchical data objects 121-123. For example for an EXISTS query, more or less identical data access requests such as 180 may be generated and concurrently sent to all storage cells 111-112 to achieve horizontally-scaled unit-linear speedup, as discussed later herein. In another example, data access request 180 accesses none of hierarchical data objects 121-123, such as when the EXISTS query to DBMS 170 can be answered based on storage-side index(es), such as 141-142, that respective storage cells 111-112 contain, maintain, and use. DBMS 170 need not know that storage-side indices exist nor that storage cells 111-112 are autonomous.

Because data objects 121-123 are hierarchical, they may each be composed of data item(s). For example, hierarchical data object 121 contains items A-B. Also because data objects 121-123 are hierarchical and although not shown, item A may contain item B. In various embodiments, an item may have a logical role such as a key, a key-value pair, a field name (e.g. JSON dictionary key or XML attribute), a value, a JSON dictionary key or an XML tag, and/or an aggregation of other items.

A same item may be repeated in a same hierarchical data object. For example, hierarchical data object 121 contains multiple instances of item A.

A same item may be repeated in different hierarchical data objects that reside in a same storage cell. For example, storage cell 111 contains hierarchical data objects 121-122 that both contain instances of item B.

A same item may be repeated in different hierarchical data objects that reside in different storage cells. For example, storage cells 111-112 respectively contain hierarchical data objects 121 and 123 that both contain instances of item A.

Each data item or instance of a data item resides in a different location within a hierarchical data object. For example, data items A-B reside in locations X-Z within same hierarchical data object 121, including instances of same data item A residing in locations X and Z. A location may comprise an offset, such as a byte or machine word offset into a hierarchical data object, and/or an offset into an array, such as an alphabetically sorted array of items of a same or multiple hierarchical data objects.

In an embodiment not shown, locations may be unique across hierarchical data objects of a same storage cell or across document network 100 (i.e. all storage cells). In the shown embodiments, locations are guaranteed to be unique only within a particular hierarchical data object.

In an embodiment, a same location may occur in different hierarchical data objects of a same storage cell. For example, location Z occurs in both of hierarchical data objects 121-122 that are different.

In an embodiment, a same location may occur in different hierarchical data objects of different storage cells. For example, location Y occurs in both of hierarchical data objects 121 and 123 that are different.

A storage-side index, such as 141-142, may accelerate access of hierarchical data objects and/or items within them. Various kinds of storage-side indices with various uses are discussed later herein.

In this example, storage-side indices 141-142 may be used for lookup of locations X-Z (and/or identifiers of hierarchical data objects) based on criterion(s) such as a particular item, a pattern for one or multiple items, a path (or path pattern) into a hierarchy, and/or a filtration expression occurring in a path pattern. For example, storage-side index 141 may be an inverted index. In an embodiment, storage-side index 141 comprises a lookup table, a hash table, and/or other associative (i.e. map/dictionary) structure.

For example, finding item B (or counting item A instances, or detecting existence of an item C within document network 100, storage cell 111, or hierarchical data object 121 may be accelerated when one, some, or all of storage-side indices 141-142 are used instead of an exhaustive brute-force table scan. Index distribution may be as follows.

In the shown embodiment, each storage cell has its own storage-side index. For example, the kind of each storage-side index and/or the content of each storage-side index may be different. As discussed later herein, a same storage cell may have different kinds of storage-side indices and/or different instances of a same kind of storage-side index. In an embodiment, each storage-side index may be independently updated, such as according to traffic (i.e. usage) or content of the cell that contains the storage-side index.

Additionally and although not shown, document network 100 may have a global index that is not contained in a single storage cell, or not contained in any storage cells, or not contained in storage tier 192. For example, a global index in storage tier 192, in computation tier 191, or in DBMS 170 may indicate a distribution and/or replication of hierarchical data objects and/or items within them.

In the shown embodiment, storage-side index 141 resides in memory 130 to further reduce latency. Depending on the embodiment, storage-side index 141 may be loaded directly from disk, indirectly built from other data or metadata on disk, or originally built directly in memory 130.

In an embodiment, storage cells 111-112 are autonomous, such that each cell independently maintains and dynamically updates its own storage-side index, such as according to traffic or content of the cell. For example, storage cell 111 may have logic that maintains storage-side index 141, such as by monitoring reads and/or writes, and maintaining statistics thereof, such as discussed later herein.

Also as discussed later herein, autonomous storage cell 111 may have logic that, based on the cell's usage statistics, dynamically decides when, which kind, and/or which instances of its own storage-side indices to load, create, update, tune, persist, and/or discard. In an embodiment, autonomous storage cell 111 can periodically maintain its own storage-side indices even when offline, such as when in an administrative maintenance mode or when the cell's connectivity to document network 100 is temporarily lost.

2.0 Example Data Access Process

Figure 2:
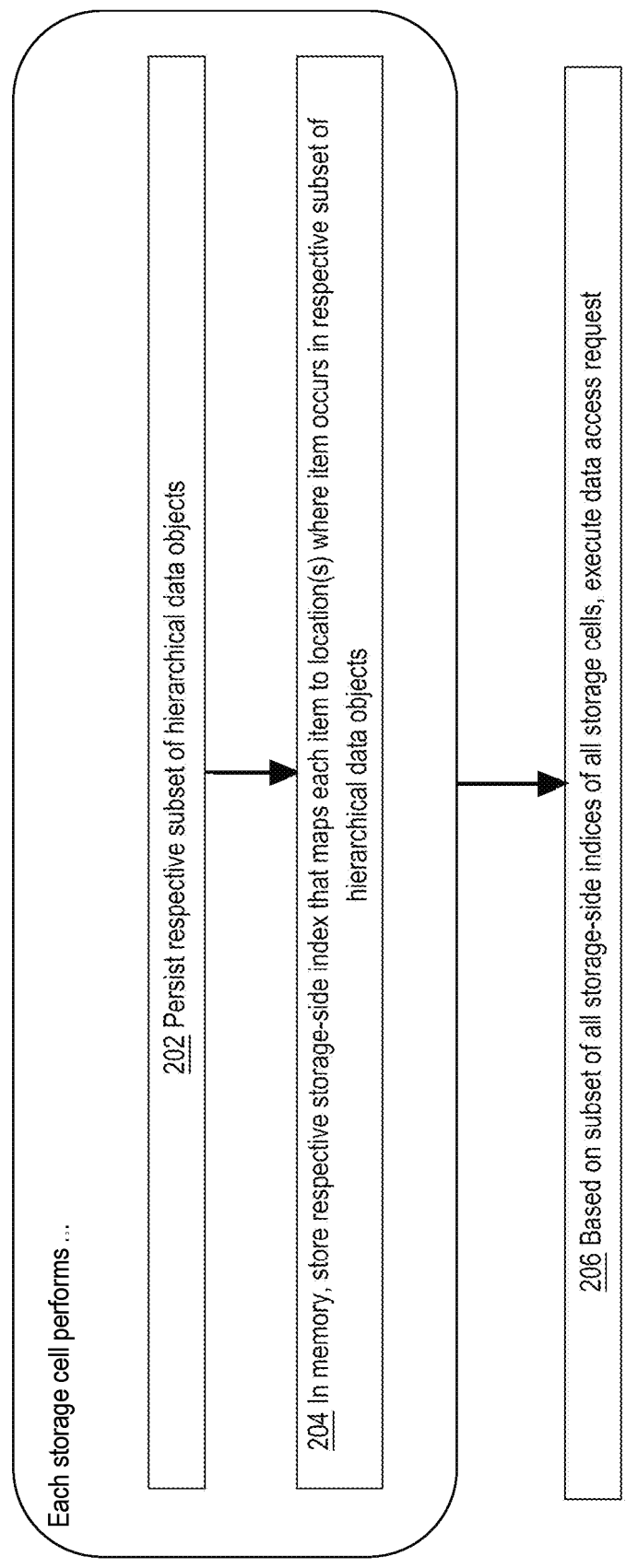
FIG. 2 is a flow diagram that depicts an example data access process for using autonomous and storage-side indices to accelerate selective access into a distributed collection of hierarchical data objects.

FIG. 2 is a flow diagram that depicts document network 100 using storage-side indices to accelerate selective access into a distributed collection of hierarchical data objects, in an embodiment. FIG. 2 is discussed with reference to FIG. 1.

Document network 100 may optionally have a central server that additionally performs one, some, or all of the steps of FIG. 2. Whereas, an autonomous storage cell should perform steps 202, 204, and circumstantially none, some, or all of the activities of step 206. For example, all storage cells 111-112 conditionally and autonomously perform step 204 and, for a particular access request, may or may not participate in steps 202 and/or 206.

As explained herein, operation of document network 100 and autonomous storage cells 111-112 may be sensitive to traffic and content. Also as explained herein, such sensitivity may be local to a storage cell such that reconfiguring individual storage cells may be autonomous (i.e. locally and independently controlled).

However, traffic and content should not be regarded as opaque and/or monolithic. That is, traffic actually is a multiplicity of individual data access requests that each causes operations, which may contribute to usage statistics. Data access requests may sometimes be more or less concurrent, sometimes not concurrent, and sometimes a storage cell may be apparently idle to clients. Thus, the steps shown in FIG. 2 may each reoccur at various times for various data access requests, or for no data access request at all, such as during lazy and incremental initialization (i.e. boot) of document network 100 or of a storage cell, or autonomously by a storage cell while in service.

For example, storage cell 111 (and/or document network 100) may, by itself, concurrently perform one, some, or all of the steps of FIG. 2, and repeated occurrences of a same step may concurrently occur for a same or different storage cell, such as for different access requests or spontaneously. Thus, momentary traffic may concurrently activate all of the steps of FIG. 2, and any or all of those steps may have at least one occurrence executing for more or less the entire time that storage cell 111 (or document network 100) is in service.

In other words and especially under heavy load, it may be that all of those steps are always ongoing. Thus, step 202 that persists a respective subset of hierarchical data objects into the durable storage of storage cell 111 may occur with arbitrary/sporadic frequency such as for a car dealership, or more or less constantly ongoing for a stream of hierarchical data objects to be spooled into storage cell 111 such as from an internet of things (IoT).

For example, step 202 may or may not be complete or completely repeated before subsequent steps begin. With horizontal parallelism across multiple storage cells 111-112, storage cell autonomy may be especially beneficial to exploiting optimization opportunities that accidentally or intentionally arise, as discussed later herein. In some embodiments, storage cells in storage tier 192 may be more scalable than an accompanying collection of database server instances (not shown) in computational tier 191. For example, the storage cells need not limit system throughput, especially with autonomous throughput optimizations presented later herein.

Regardless of whether storage cells 111-112 store same (i.e. replicas) or different content, storage cell autonomy (discussed below) may emphasize administration of storage-side indices of the storage cell, especially as discussed later herein. In step 204, a storage cell may store, within its memory, one or more respective storage-side indices, such as indices that map content items to location(s) where each item occurs in the local hierarchical data objects of the storage cell, or map items to documents, or both.

In step 206, a data access request is received and executed by document network 100. For example, DBMS 170 may receive a database query from a client and responsively send one or more data access requests, such as 180, to one, some, or all storage cells. Based on one, some, or all of the storage-side indices of those storage cells, execution of data access request 180 is accelerated. Storage-side index operation and administration are discussed later herein.

3.0 Storage Cell Autonomy

Figure 3:
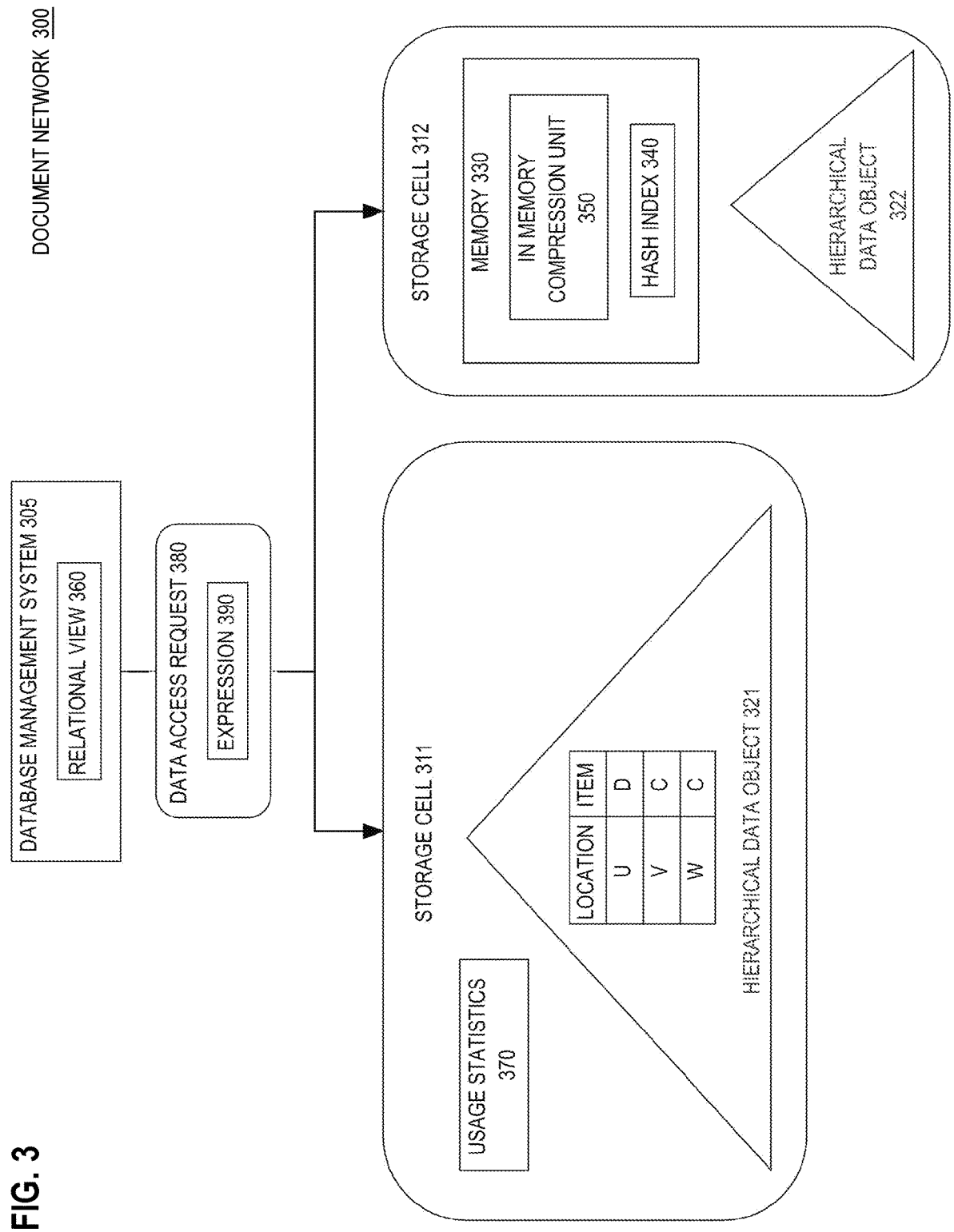
FIG. 3 is a block diagram that depicts an example document network that operates as a data grid of autonomous storage cells and provides location transparency.

FIG. 3 is a block diagram that depicts an example document network 300, in an embodiment. Document network 300 operates as a data grid of autonomous storage cells and provides location transparency. Document network 300 may be an implementation of document network 100.

As explained above, each storage cell, such as 311-312, may autonomously maintain its own storage-side index(s), such as according to dynamic and local conditions. Each storage cell 311-312 may dynamically decide when, which kind, and/or how many instances of its own storage-side indices to load, create, update, tune, persist, and/or discard. Different example kinds of storage-side indices are as follows, and each storage cell may dynamically create or discard instances of them according to fluctuating conditions, such as tracked as local usage statistics 370 as maintained by storage cell 311.

Usage statistics 370 may include results of analysis of data access requests, such as 380, and/or results of contents analysis of contents of storage cell 311. In an embodiment not shown, document network 300 also maintains global usage statistics. In an embodiment, each of storage cells 311-312 may read and/or write its own local usage statistics such as 370 or the global usage statistics.

Various embodiments may use Oracle ExaData storage cells as follows. An ExaData system is architected to separate database server compute nodes from storage cell nodes. Especially when document network 300 stores JSON documents, DBMS 305 may accept queries against JSON documents stored in storage cell's within document network 300. As human readable text, JSON is encoded as a string, with a character set, that is naturally sparse. For example as raw text, a month may be encoded as "September", or densely binary encoded as a zero-based integer value of eight, which may need is few as four bits and still denser than raw text even when aligned to a one, two, four, or eight byte boundary, because raw "September" needs nine bytes.

Thus, binary encoding achieves compression. Depending on the embodiment, documents may, in transmission and/or in storage, be encoded as text or encoded in a binary format, such as OSON, which may be entirely or more or less schema-less. For example, a storage cell may store a document as a set of OSON data blocks that may or may not be directly accessible to DBMS 305.

In an OSON embodiment, each unique field name within a JSON document is assigned an integer field name identifier and is stored only once so that multiple references to the same field name are replaced with its field name identifier. Because the identifiers take just a few bytes, the OSON encoding typically saves significant space when the original document has a nested array of sub-objects, or encodes a recursive hierarchical structure. The biggest benefit of assigning identifiers is that they can facilitate rapid navigation to a child field given by performing a binary search using integer comparisons. OSON stores the field name identifiers for each object in sorted order to support this type of access.

JSON objects may have named fields, may be nested, and may be arranged within an array. For example, object instances of a same kind of object may all have the same name fields, even if the values of those fields vary across the object instances. OSON compresses an array of similar (i.e. same set of field names) objects as follows. Raw field names or their integer identifiers may be included once within the array, either in array metadata or in the first element (i.e. object instance) in the array. Subsequent object instances in the array may omit the field names or identifiers, which are implied to achieve compression.

OLAP queries issued against JSON documents are table scan driven and may be pushed down to storage cell(s) with the storage cell evaluating JSON predicates over OSON storage data blocks. A scan involving multiple storage cells is executed in parallel with OSON content loaded in flash cache in the storage cells. Thus even if cache thrashing does occur: a) scanning is accelerated by horizontal scaling, b) the thrashing does not occur in a cache of DBMS 305, and c) the thrashing does not entail network traffic, which is substantially different performance characteristics than with a state of the art table scan directly by the computer of DBMS 305.

For example, OLTP queries may be index driven to exploit DBMS buffer caching of frequently accessed OSON data blocks and index blocks. DBMS 305 may autonomously decide not to delegate OLTP filtration to storage cells 311-312. Whereas, OLAP queries may be table scan driven so that they are autonomously pushed down to storage cells 311-312 that can evaluate JSON predicates over OSON storage blocks. Storage cells 311-312 may execute a same scan in parallel and may cache OSON blocks in their own respective cache. Thus, query planning may: a) automatically detect what kind of data structure does a scan rely on, and b) autonomously decide whether or not to delegate the scan to storage cells 311-312. For example, a table scan that typifies OLAP may be pushed down to storage cells 311-312. Whereas, an index scan that typifies OLTP should not be pushed down and should instead be directly performed by the computer of DBMS 305.

Pushing filtration down to storage cells 311-312 need not forgo use of an index, because storage cells 311-312 may have storage side indices as discussed later herein. However, query planning by DBMS 305 does not consider storage side indices and may be unable to discover storage side indices that, as discussed later herein, are autonomously and privately created and maintained by each of storage cells 311-312. In some cases, indices in both of DBMS 305 and storage cells 311-312 may be used for a same query or even a same scan.

Filtration may be pushed to the storage servers even when a DBMS determines that it defines an index that may be used to evaluate path expression specified in a query. In effect, the DBMS treats or categorizes evaluation of the path expression as an OLAP workload rather than an OLTP workload and pushes evaluation of the path expression to a table scan that the DBMS requests the storage server to perform.

For example, a DBMS receives a query that references in a predicate a path-based operator based on a path expression. When compiling the query, the DBMS determines that the DBMS defines an index that may be used to evaluate the path expression but also determines the selectivity of the path-based operator is low. In response to determining the low selectively, the DBMS for generates an execution that includes a table scan with a filter that filters documents in the table based on the path expression. When executing the table scan filter, the DBMS requests storage to scan for documents in the table that satisfy the path expression. The storage cells use storage side index to evaluate the path expression to determine which data blocks include hold the documents that satisfy the path expression.

Although query planning occurs in DBMS 305 and algebraic queries are not themselves relayed to storage cells 311-312, in an embodiment QBE can be more or less directly delegated to storage cell(s). For example, storage cells 311-312 may accept an OSON encoded exemplar and answer with found matches because embodiments of storage cells may support OSON. Storage cell 311 may be configured for the OSON format and is able to evaluate JSON path expressions against JSON documents. Examples of path expressions that may be evaluated are oath-based operators for accessing documents, such as JSON. Such operators are described U.S. patent application Ser. No. 14/337,189 (U.S. Patent Publication No. 2015-00395 87A1), entitled Generic SQL Enhancement To Query Any Semi-Structured Data And Techniques To Efficiently Support Such Enhancements. Storage cells configured for scanning database data are described in: U.S. Pat. No. 8,825,678, Hash Join Using Collaborative Parallel Filtering In Intelligent Storage With Offloaded Bloom Filters; and U.S. Pat. No. 10,296,462, Method To Accelerate Queries Using Dynamically Generated Alternate Data Formats In Flash Cache.

Storage cell 311 may monitor access requests, such as 380, to detect same or similar access requests that exceed a threshold frequency and then autonomously create or remove an appropriate kind of storage-side index. The following JSON examples demonstrate some appropriate storage-side index types.

An example of a frequent filtration data access request is {"dateField": {"$date": DATE-STRING}}, where DATE-STRING is a string in an ISO 8601 format. Here, item method $date transforms DATE-STRING to a SQL value of datatype DATE. Filtration on a field such as "dateField" can be accelerated by creating a B-tree index for it. A B-tree index or a bitmap index for SQL/JSON function j son value may accelerate filtration requests. A bitmap index may accelerate SQL/JSON conditions is j son, is not j son, and j son exists. A bitmap index may be appropriate wherever the number of possible values for a function is small. For example, a bitmap index may be created for function j son value if the value is expected to be Boolean or otherwise one of a small number of string values. Function-based indexing is appropriate for access requests that target particular functions, which in the context of SQL/JSON functions means particular SQL/JSON path expressions, which might not be helpful for supporting DBMS 305's execution of database queries that are ad hoc. A function-based index is appropriate when frequently filtering with a particular path expression.

In an embodiment, in-memory acceleration is autonomously set up to cache commonly searched paths and values in a path-value index format. Each distinct path is associated with a set of sorted values under the path. Each unique value in the sorted array is associated with a posting list that represents a bitmap of all OSON documents that have such a value. Path-value data access requests, such as generated for database queries with JSON_EXISTS( ) or JSON_VALUE( ), are evaluated using the path-value index to perform an in-memory scan to yield a set of document identifiers which are then used to read the corresponding OSON format for post evaluation. Such in-memory path-value indexes are set up autonomously on the storage cell.

Path value indexes are described in U.S. patent application Ser. No. 16/022,465, Techniques for Enabling and Integrating In Memory Semi-Structured Data and Text Document Searches With In-Memory Columnar Query Processing. Each path value index on a storage cell covers contiguous regions of data blocks such as an extent. Those storage-side indices may be built on start up, and once built, preserved in persistent caches. When a data block is updated in a region, the path value index for that region may be invalidated (to prevent use) and then rebuilt. Data access requests that access a region for a path value index being rebuilt are instead evaluated by brute force (i.e. scanning and evaluating data blocks in that region).

Storage-side accessing of spatial data in a GeoJSON geometry object may be accelerated by creating a spatial index. Data access requests generated for full-text queries and/or ad hoc structural queries, such as with query by example (QBE) operator $contains, may be autonomously accelerated by creating a JSON search index. The JSON search index is a general purpose schema agnostic index created on a JSON column by maintaining an inverted index for every JSON field name and every leaf scalar value (strings are tokenized into a set of keywords to support full-text searches). The JSON search index facilitates ad-hoc SQL/JSON path query predicates such as JSON_EXISTS( ), JSON_TEXTCONTAINS( ), and JSON_VALUE( ) to be evaluated efficiently over a document collection.

Generating usage statistics 370 by storage cell 311 may entail calculating data cardinality and/or selectivity. Cardinality counts distinct values of a field, such as values in key-value pairs for a key such as "date". Average selectivity is a ratio of cardinality to the extent of a population, such as pairs whose key is "date". Specific selectivity is a ratio of filtered to unfiltered population, according to specific filtration criteria, which may be compound criteria. For example, specific selectivity may arise from applying filtration criteria that may be supplied by data access request 380, such as according to filter expression 390. Hash index 340 may contain all or part of filter expression 390.

For a highly selective (i.e. exceeds a selectivity threshold) exact path filtration, a hash index may be created. For a highly selective range path filtration, a B+ tree index may be created, which may be singleton or multi-valued. For full-text search, a path-subsetted JSON search index with asynchronous mode by default is appropriate. For a highly selective multi-valued data, a statement refreshable json_table( ) materialized view is appropriate.

For highly selective path value filtration, it is more beneficial to maintain synchronized B+ tree based functional indexes. However, maintaining B+ tree indexes degrades DML performance, therefore, a balance between some functional indexes created and their benefit for improving OLTP and OLAP data access performance should be struck. Expression execution statistics to find commonly used JSON_EXISTS( ) and JSON_VALUE( ) expressions used in a WHERE clause in the workload. Expression execution statistics are described in U.S. patent application Ser. No. 15/146,798. ATP autonomous indexing creation work is leveraged to determine if functional index creation is worthwhile.

For non-highly selectivity data accesses, improved table scan at a storage cell based on an in-memory scan is appropriate. In-memory scan, as the term is used herein, involves a scanning an in-memory cached version of a persistent form ("PF") of database data. A unit of PF database data is cached in-memory in a unit referred to herein as an in-memory compression unit (IMCU). An IMCU may have a different data format than a disk block format for same data. For example, a columnar IMCU may de-normalize (i.e. segregate) data of a same type and meaning such as values of key-value pairs of a particular key, such as "color". A columnar IMCU may exploit vector hardware of the storage cell such as a graphical processing unit (GPU) and/or single instruction multiple data (SIMD), especially for scanning. A columnar IMCU may comprise compression such as dictionary encoding or run length encoding (RLE). For values of variable length, dictionary encoding into fixed length codes may suit vector hardware that cannot readily process values of variable length. The content of a columnar IMCU may be OSON encoded.

An in memory expression unit (IMEU) is an IMCU that stores derived data, such as filtered and/or transformed data. For example, a columnar IMEU may cache local values that satisfy a filtration expression of a data access request. IMCUs and IMEUs are presented in U.S. patent application Ser. No. 16/144,926.

'Indexing all' over JSON collection approach may be used. However, 'indexing all' is expensive and aggravated by heavy DML OLTP/JDOM services. In-memory storage-side indexing structures on top of NVRAM (non-volatile random access memory) is more appropriate.

In some cases, items A-B may be used as keys and/or values of storage-side index(es). Based on usage statistics, a particular item may be dynamically added or removed to a storage-side index.

DBMS 305 may, based on its own usage statistics (not shown), superimpose/overlay a relational database view, such as 360, such as to support and optimize SQL access to hierarchical data objects such as 321. The database view may have statement refreshing and/or materialization. With view materialization, DBMS 305 can process, and expose to clients, hierarchical data objects 321-322 as tabular data that can leverage many of the subsystems (not shown) of DBMS 305 such as query optimization and metrics of usage or content. Likewise, database view 360 may facilitate relational algebra, such as SQL, such as from clients. When to create database view 360 may be based on query selectivity of multi-valued data.

In an embodiment, SODA creates a JSON_TABLE( ) materialized view (MV) based on a data guide in order to run queries based on a relational algebra such as SQL over a JSON document collection. JSON_TABLE( ) MV usage is monitored by DBMS 305 to determine if creating JSON_TABLE( ) MV would improve efficiency by leveraging and integrating Oracle's autonomous MV creation framework.

Not all columns are accessed equally in a relational model (i.e. materialized view). Frequently read columns with high selectivity may guide RDBMS 305 creating an index in RDBMS 305 to improve OLAP queries without adversely affecting random DMLs over heavily used relational tables of materialized views. In support of materializing a view, RDBMS 305 may have a so-called data guide that infers and retains schematic details from a collection of schema-less documents, such as JSON.

In a JSON document collection in another use case that entails more direct document access than through a database view, a data guide in RDBMS 305 for a JSON document collection is generated by RDBMS 305 to determine JSON paths and leaf value domain types and/or datatypes. An example of a data guide is described in U.S. Pat. No. 9,864,816, Dynamically Updating Data Guide For Hierarchical Data Objects. Based on datatypes of leaf values, appropriate indexes may be determined.

A data guide for leaf datatypes and paths is a portable mechanism that can be an internal part of a storage cell. Each storage cell may autonomously maintain its own data guide, which may be operated by the storage cell: a) as a kind of storage-side index, b) to facilitate the generation and/or maintenance of other kinds of storage-side indices, and/or c) to facilitate OSON processing such as inspection or encoding.

Commonly accessed JSON paths and their leaf value distribution statistics may be gathered by a storage cell. A leaf value might be subject to an equality test, value range filtration, full-text search, or GeoJson spatial matching. Since most of such data accesses are generated by DBMS 305's SODA QBE API or data guide relational view API, path/value data domain usage patterns and statistical value distribution can be internally maintained by a storage cell according to its own local JSON document collection. From the usage patterns of data access requests, storage cells executing those patterns may be accelerated without impacting DML in DBMS 305. Such acceleration adjustments can be autonomously decided by each storage cell. Thus, a storage cell's statistics and/or data guide may provide important metadata upon which autonomous decisions may be made by the storage cell for self-administering various optimization structures such as storage-side indices. Thus, autonomy may be data-driven for agility (i.e. opportunistic adjustment) in ways that a state of the art storage tier cannot support for lack of embedded intelligence.

Storage-side indexing and general efficiency may be much affected by traffic/usage. One or both of two types of usage may predominate, and the stereotypes may be antagonistic, that degrade (i.e. degrade each other's efficiency).

Read-only use is typical of reporting and multidimensional analytics, such as with OLAP, such as in a data warehouse. Read-only use tends to be sequential, such as with scans, which may thrash a cache of (e.g. OSON) blocks, records, rows, or documents. Indices provide most benefit to read-only use.

Mutable use is typical of live systems, such as OLTP, such as for data entry and/or commerce. Mutable use tends to entail random access and small working sets of data, which are amendable to caching, but can stress indices with frequent changes.

In an embodiment, document network 300 may serve both OLAP and OLTP for different or same hierarchical data objects. Interference (i.e. degraded performance) may occur when a same storage cell more or less concurrently endures both uses. For example, patterns evident in local usage statistics 370 of storage cell 311 may become, which may restrain the logic of a storage cell from selecting optimizations. Such mixed use may overwork storage-side indices and/or thrash caches in storage cell 311. Thus, mixed use can reduce throughput of storage cell 311 and/or document network 300. Mixed use may also reduce or eliminate the performance benefit of storage cell autonomy.

To preserve throughput in an embodiment, document network 300 may route client sessions and/or particular access requests to particular storage cell(s) with relevant replica content. For example, OLAP and OLTP may be routed to respective storage cells 311-312 having partially or entirely replicated content. Replica coherence (i.e. synchronization) may be streamed such as in real time or scheduled such as hourly or nightly. For example, daily, weekly, and monthly reports do not need live replication. Likewise, a data scientist engaged in product research and development (R&D) does not need live replication. In an embodiment, document network 300 comprises public and/or private cloud(s) such as with elastic horizontal scaling (i.e. spontaneous replication). In an embodiment, replication is synchronous and ACID transactions are supported. In an embodiment, replication is asynchronous (i.e. eventual).

Regardless of topology concerns such as replication and scaling, throughput of storage cells 311-312 and document network 300 may benefit from traffic shaping such that OLAP and OLTP are segregated. The autonomy of each storage cell benefits from segregation of traffic and/or content because local workload of each storage cell may be more consistent and focused, from which more clear patterns in usage statistics 370 may emerge. When storage cells 311-312 are autonomous, each cell may automatically administer and tune storage-side indices and caches such as IMCUs for its own local content and workload, thereby achieving optimal local throughput of each storage cell, which directly contributes to optimal global throughput of document network 300.

For example if hierarchical data objects 321-322 are purchase orders, then queries for orders of a current month may emphasize order contents such as line items. Whereas, queries for orders of an immediately previous month may emphasize status of payment and shipping. Thus, even if all traffic to some or all storage cells is for OLAP, segregating (i.e. distributing) hierarchical data objects 321-322 by content may increase throughput. For example, hierarchical data objects 321-322 may be distributed to storage cells 311 by month of purchase order so that storage cell autonomy may be better exploited.

4.0 Example Autonomous Tuning Process

Figure 4:
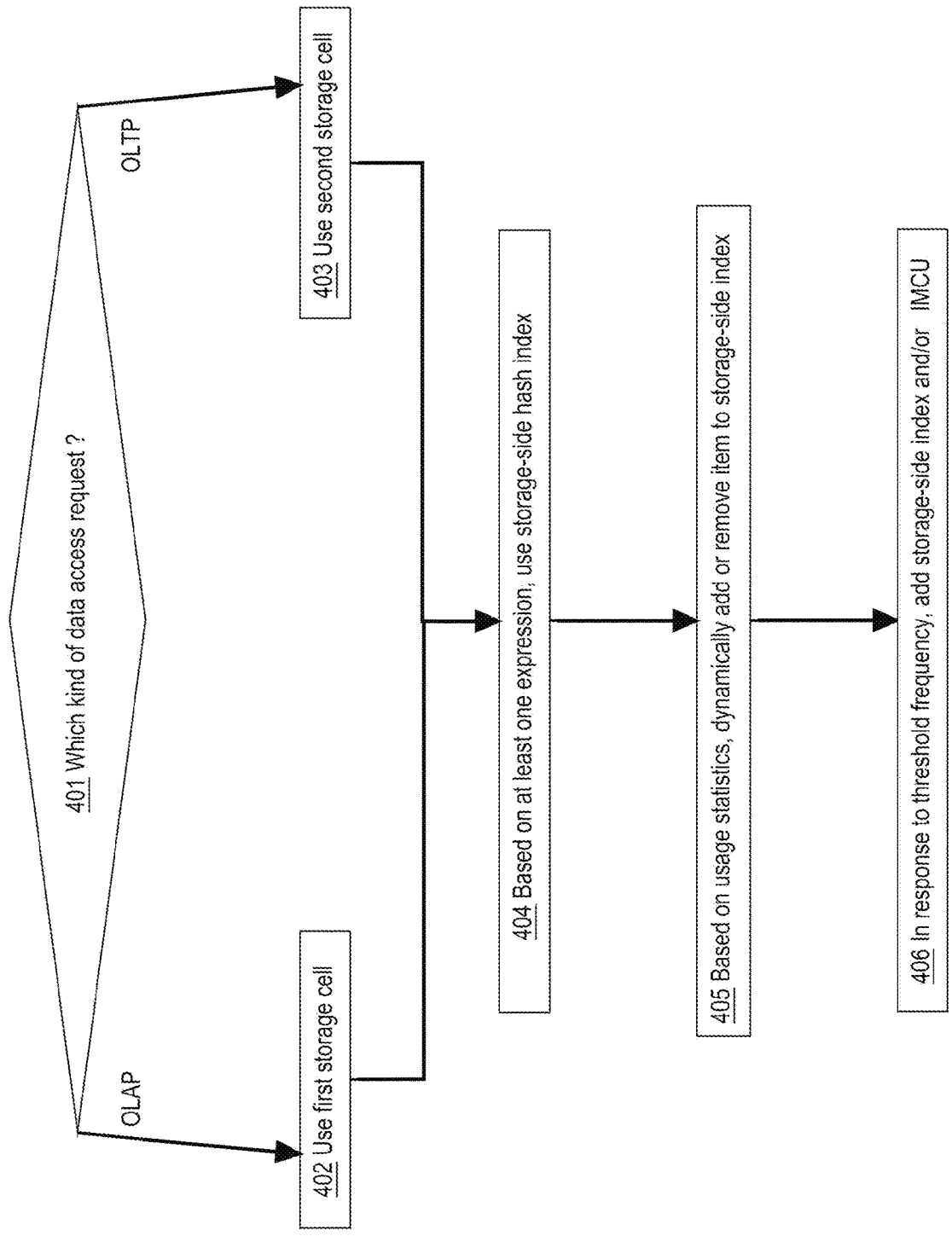
FIG. 4 is a flow diagram that depicts an example autonomous tuning process for operating as a data grid of autonomous storage cells and providing location transparency.

FIG. 4 is a flow diagram that depicts document network 300 operating as a data grid of autonomous storage cells and provides location transparency, in an embodiment. FIG. 4 is discussed with reference to FIG. 3.

Document network 300 has many storage cells, such as 311-312, that may have partitioned and/or replicated content. In some examples, document network 300 may need to select storage cell(s) to participate in execution of data access request 380, perhaps based on workload and/or contents of storage cells, contents of data access request 380, type of data access request 380, and/or type of client session.

In step 401, type of data access request 380 and/or type of a client session are inspected to select which of storage cells 311-312 should execute data access request 380. As shown, OLAP access is routed to storage cell 311, and OLTP access is routed to storage cell 312, per respective steps 402-403.

Thus, storage cell 311 naturally tunes its storage-side indices for OLAP, and storage cell 312 for OLTP. That autonomous tuning may occur without expressly notifying storage cells 311-312 of their respective usage designations as OLAP or OLTP.

Steps 404-406 may occur in various orderings other than shown. Steps 404-405 are performed by the selected storage cell(s), such as 311 for OLAP, and involve use and/or administration of storage-side indices of that storage cell.

Step 404 uses hash index 340, such as a path pattern index or other filter pattern index. For example, expression 390 may be a filter expression, such as a partial or entire WHERE clause or XPath, that is used as a lookup key into hash index 380 that resides in memory 330, which may be fast RAM. Hash index 380 may return identifier(s) of hierarchical data object(s) and/or location(s) or identifier(s) of item(s) within hierarchical data object(s) that are stored in the storage cell.

Storage cell 311 may autonomously update its storage-side indices in response to an access request, a schedule, and/or resource demand. Based on usage statistics 370, step 405 dynamically adds or removes an item to a storage-side index. For example, data access request 380 may bear a new hierarchical data object for persistence into storage cell 311. The new hierarchical data object may contain items that are reachable by traversal paths within the new hierarchical data object that match path patterns that are already stored in a storage-side index. The mappings of those path patterns may be updated in the storage-side index to include locations of those items in the new hierarchical data object.

Storage cell 311 may autonomously create or discard optimization metadata in response to an access request, a schedule, and/or resource demand. In response to threshold frequency, such as for selectivity or other aspect of usage statistics 370, step 406 creates or discards a storage-side index, a local relational view, a local cache, and/or a local IMCU. For example, when a usage ratio of random access to sequential falls below a threshold, a cache may shrink or be discarded and/or a storage-side index may be discarded. When memory availability falls below a threshold, an IMCU may be discarded and/or a cache may shrink or be discarded.

A threshold frequency of query(s) or join(s), as measured by an RDBMS, may cause the RDBMS to create or discard a database view that may span contents of one, some, or all storage cells. A database view or its view table may be further operated by the RDBMS to measure statistics of usage and/or content of storage tier 300. Thus, the RDBMS may maintain centralized statistics for RDBMS optimization that are orthogonal (i.e. separate) to local statistics in the storage cells.

5.0 Example Storage Cell

Figure 5:
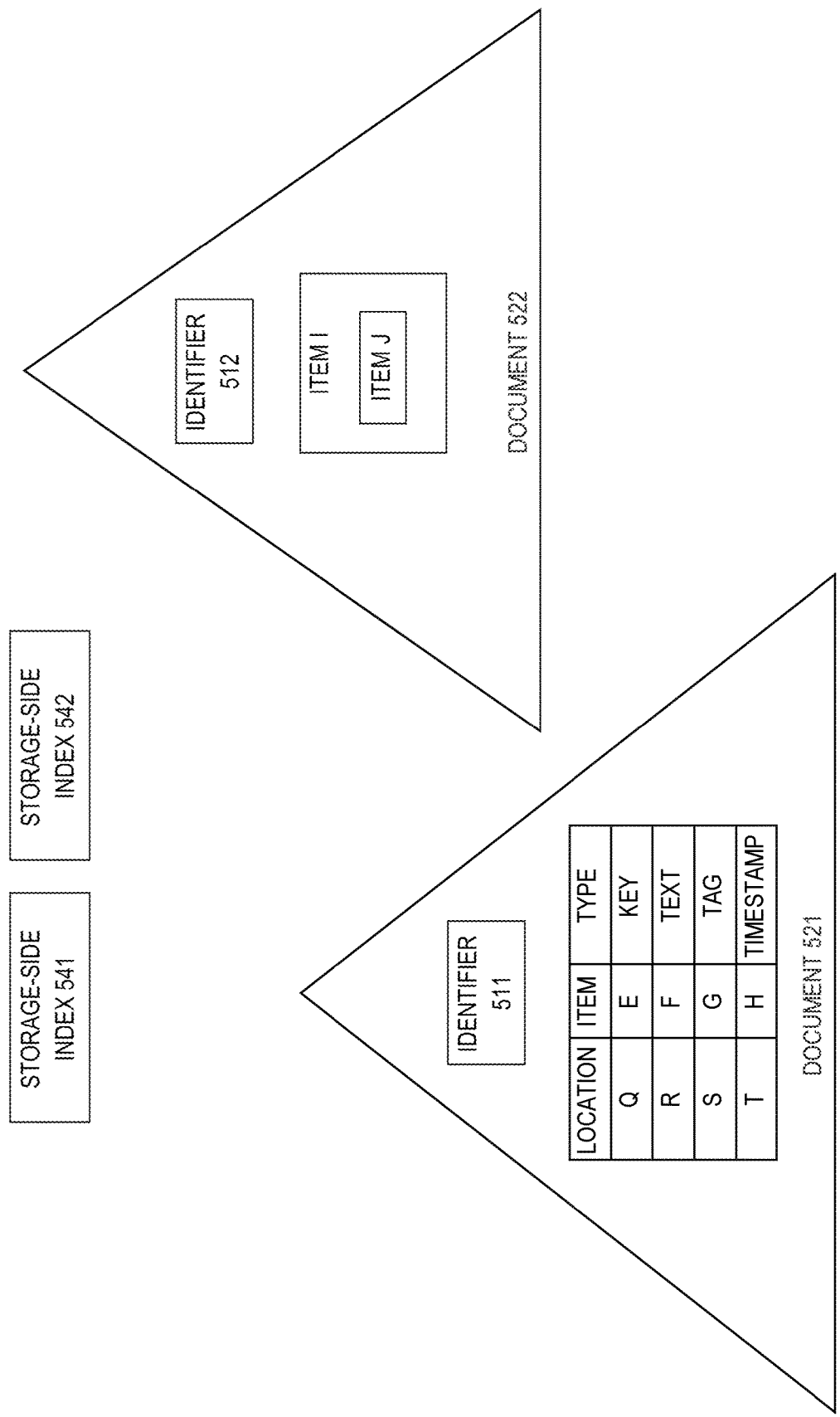
FIG. 5 is a block diagram that depicts an example storage cell that has storage-side indices that are content oriented in various ways.

FIG. 5 is a block diagram that depicts an example autonomous storage cell 500, in an embodiment. Storage cell 500 has storage-side indices that are content oriented in various ways. Storage cell 500 may be an implementation of storage cell 111.

Each of documents 521-522 may be stored as a self-contained unit such as a blob, byte array, data structure, or document object model. In an embodiment, documents 521-522 are exchanged with clients and/or stored in storage cell 111 in a binary encoding, such as a data structure, such as Oracle's OSON (i.e. binary JSON). For example, a client driver may bidirectionally transcode between OSON and JSON, between OSON and a custom document object model (DOM), between OSON and a proprietary application programming interface (API), and/or between OSON and a legacy object model, such as with a data binding and/or marshalling framework. In an embodiment a self-contained binary format contains a document and index(es) that are dedicated to accessing the internals of the document such as items E-H or I-J.

An example implementation of OSON is described in related U.S. Pat. No. 10,262,012, Techniques Related to Binary Encoding of Hierarchical Data Objects to Support Efficient Path Navigation of the Hierarchical Data Objects. OSON enables more efficient query execution and partial updating of JSON documents. Specifically, OSON enables fast storage-side index maintenance during DML, making partial JSON document update feasible by, among other things, reducing re-do logging overhead, and accelerating path queries as the OSON format itself is a DOM tree.

In an embodiment, document 521-522 may be persisted into a relational database. For example, document 521 may be stored as a binary/character large object (i.e. BLOB or CLOB). Alternatively, document 521 may be logically shredded into separate fields for storage into separate columns and or separate tables of a relational database.

Regardless of encoding details such as binary or raw text, when document 521 is stored as a self-contained unit, use of a storage position and/or identifier of the whole document may accelerate access. For example, storage-side index 541 may be a document index that contain positions or identifiers, such as 511-512, of documents. Depending on the embodiment, document identifiers 511-512 may be globally unique across a document network, or only locally unique within storage cell 500.

In an IMCU embodiment, document identifiers 511-512 may only be unique within the IMCU. For example, document identifiers 511-512 may be offsets into an IMCU. For example, a columnar IMCU stores only values of a same kind of item, such as colors. For example when document identifiers 511-512 are offsets into a pair of columnar IMCUs that respectively store colors and dates for same documents in same ordering, then offsets selected from one IMCU may be used to cross reference into the other IMCU.

Furthermore, bitmap index(es) may be limited to a particular IMCU and, in some cases, compound filtration may be achieved by bitwise conjunction or disjunction of bitmaps of IMCUs for different columns/fields. Those bitmaps may be lazily created, such as only for a current access request. In a database embodiment, document identifiers 511-512 may be used as primary keys for accessing respective documents 521-522 that may each be stored as a BLOB in a table column.

Each item E-H may conform to a respective datatype, such as a weak type such as text) or a strong type such as a timestamp. Strong typing may facilitate additional optimization of time and/or space. For example, raw text of a Chicago timestamp and a Boston timestamp may, because of time zones, be alternate representations of a same UTC time and thus be semantically equivalent despite not being literally equivalent. A scan of timestamps may be accelerated by avoiding data conversions when timestamps internally have a same canonical encoding.

Storage-side indices may also be accelerated when segregated by item type, as opposed to a single monolithic storage-side index of raw text of discrepant items. For example, storage-side index 541 may be dedicated to timestamp items, and storage-side index 542 may be dedicated to another strong type or to raw text. Segregated storage-side indices may further benefit storage cell autonomy because one storage cell may process mostly timestamps and another storage cell may mostly process another datatype. Whereas, forcing both storage cells to use only a respective storage-side index of a same datatype would reduce local and global throughput. For example, storage cell 500 may autonomously decide which datatypes deserve storage-side indices based on local traffic and content of storage cell 500.

Some datatypes, while manifest as items within content, may have datatypes of a structural nature. For example, an item may represent an XML tag, for which there may be a tag datatype. Likewise, an item may represent a key, such as a JSON dictionary key or XML attribute name, of a key-value pair, for which there may be a key datatype. For example, storage-side index 541 may Because documents 521-522 are internally hierarchical, items may be nested. For example, item I contains item J, such as with elements in XML or an array or dictionary in OSON or JSON. Queries such as path queries such as XPath may be accelerated with a hierarchy index such as a path index. For example if storage-side index 541 is a path index, then storage-side index 541 may reflect that item I contains item J.

6.0 Example Storage-Side Index Administration Process

Figure 6:
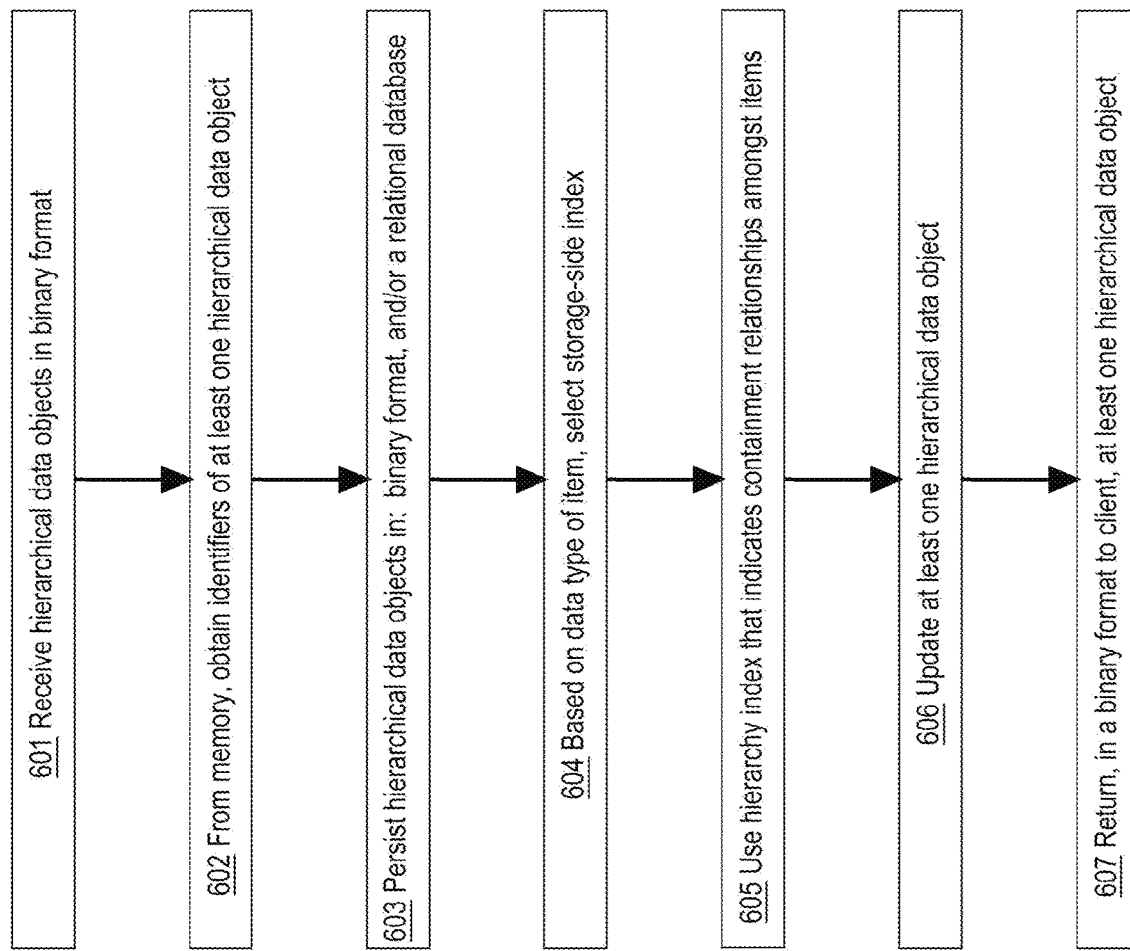
FIG. 6 is a flow diagram that depicts an example index administration process for using and administering storage-side indices that are content oriented in various ways.

FIG. 6 is a flow diagram that depicts storage cell 500 using and administering storage-side indices that are content oriented in various ways, in an embodiment. FIG. 6 is discussed with reference to FIG. 5.

FIG. 6 shows steps performed by storage cell 500. Some of these steps are reordered or skipped, depending on the example and/or embodiment. For example, some of these steps support reading, some steps support writing, and some steps support reading and writing.

If storage cell 500 persists documents 521-522 in a binary format, then efficiency may be increased as follows when client(s) send documents 521-522 in that binary format. Step 601 receives documents 521-522 in a binary format such as OSON, such as from a client. A binary format may be denser than text, and thus consume less network bandwidth. The mere act of encoding an original document into a binary format may demand computer resources, which benefits from horizontal scalability when each client performs such binary encoding. That prevents the document network from being a bottleneck for concurrent encoding for multiple clients.

Step 602 detects which local documents are relevant to an access request. For example, a path index or other storage-side index in memory may be consulted to obtain identifiers of potentially relevant documents. For example, a storage-side index may identify documents that are relevant to a query. The same or a different storage-side index may indicate whether or not a document is already persisted, such as when automatically deciding whether to insert a document as new or instead selectively update part(s) of the document.

Step 603 persists received document(s). That may entail persisting the document in a binary format, such as received or by dynamically encoding the document into binary. The document may be persisted into a filesystem and/or a database. Persistence into a database may be as-is (e.g. BLOB) or according to decomposition such as shredding of the document into fields for persistence into table columns.

As explained above, there may be a separate instance of a storage-side index for each of several item datatypes, and/or some kinds of storage-side indices may be limited to some kinds of items. Step 604 selects which kind and/or instance of storage-side index to use to access an item based on which datatype is the item. For example, JSON dictionary entries or XML tag items may entail a hierarchical index that may or may not have been built with additional structural information such as a document type descriptor (DTD), XML schema, or other schematic descriptor of document structure. For example, step 605 uses a hierarchy index that indicates containment relationships amongst items, such as for counting or locating child items of a given parent item.

Step 606 updates document(s) that are already persisted. For example, storage cell 500 may automatically decide whether to overwrite (i.e. entirely replace) a document or instead selectively update only items that change in the document. A document update may necessitate updates to one or more storage-side indices based on which items within the document actually change.

For a query, the document network may return matching documents to a client. For example if documents are stored as binary, then matching documents may be returned by step 607 as binary for reduced size and/or horizontal scalability or decoded into text by storage cell 500 before returning them.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 7:
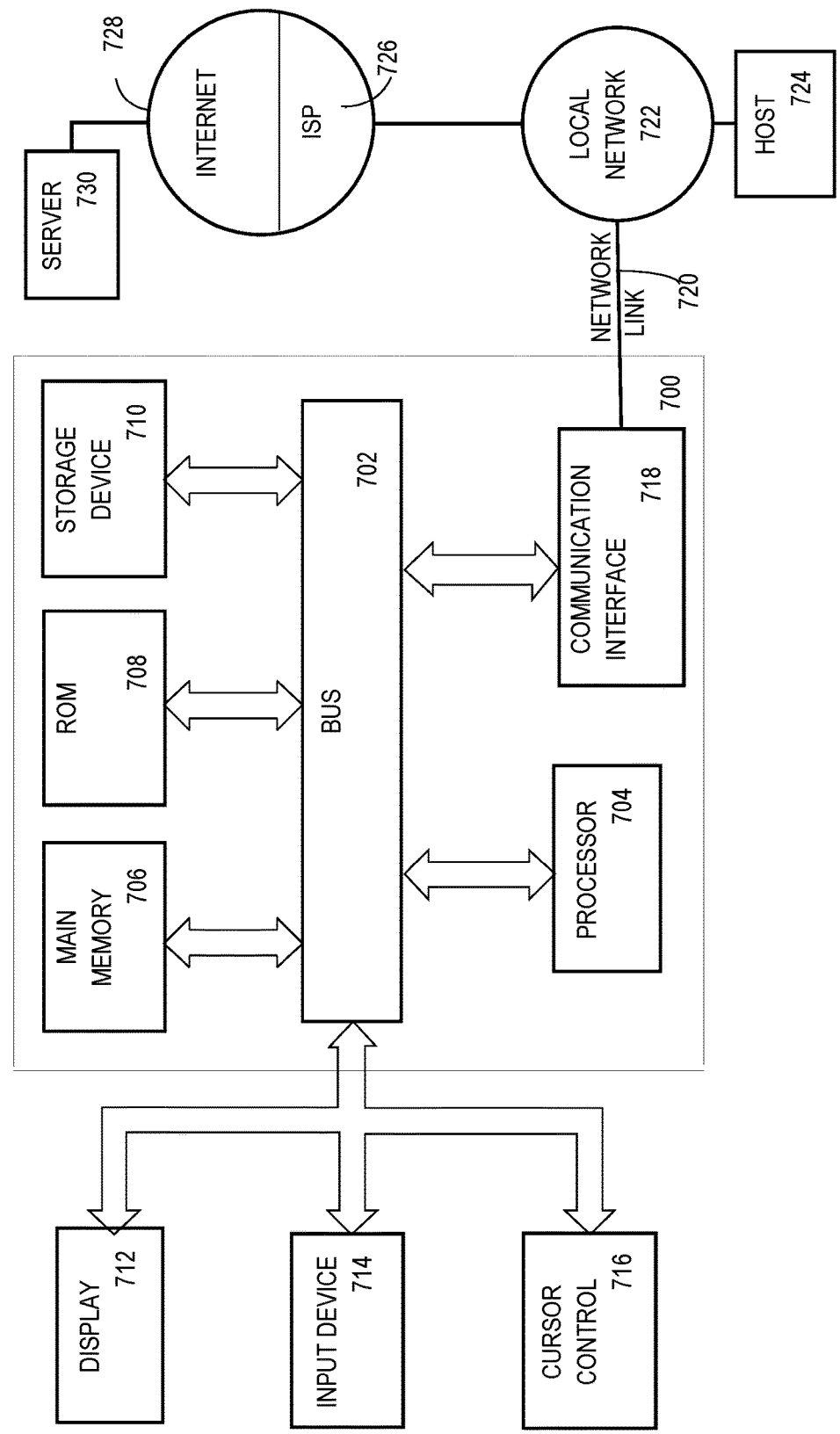
FIG. 7 is a block diagram that illustrates a computer system upon which an embodiment of the invention may be implemented.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk, optical disk, or solid-state drive is provided and coupled to bus 702 for storing information and instructions.

Computer system 700 may be coupled via bus 702 to a display 712, such as a cathode ray tube (CRT), for displaying information to a computer user. An input device 714, including alphanumeric and other keys, is coupled to bus 702 for communicating information and command selections to processor 704. Another type of user input device is cursor control 716, such as a mouse, a trackball, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane.

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 710. Volatile media includes dynamic memory, such as main memory 706. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid-state drive of a remote computer. The remote computer can load the instructions into its dynamic memory and send the instructions over a telephone line using a modem. A modem local to computer system 700 can receive the data on the telephone line and use an infra-red transmitter to convert the data to an infra-red signal. An infra-red detector can receive the data carried in the infra-red signal and appropriate circuitry can place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

Software Overview

Figure 8:
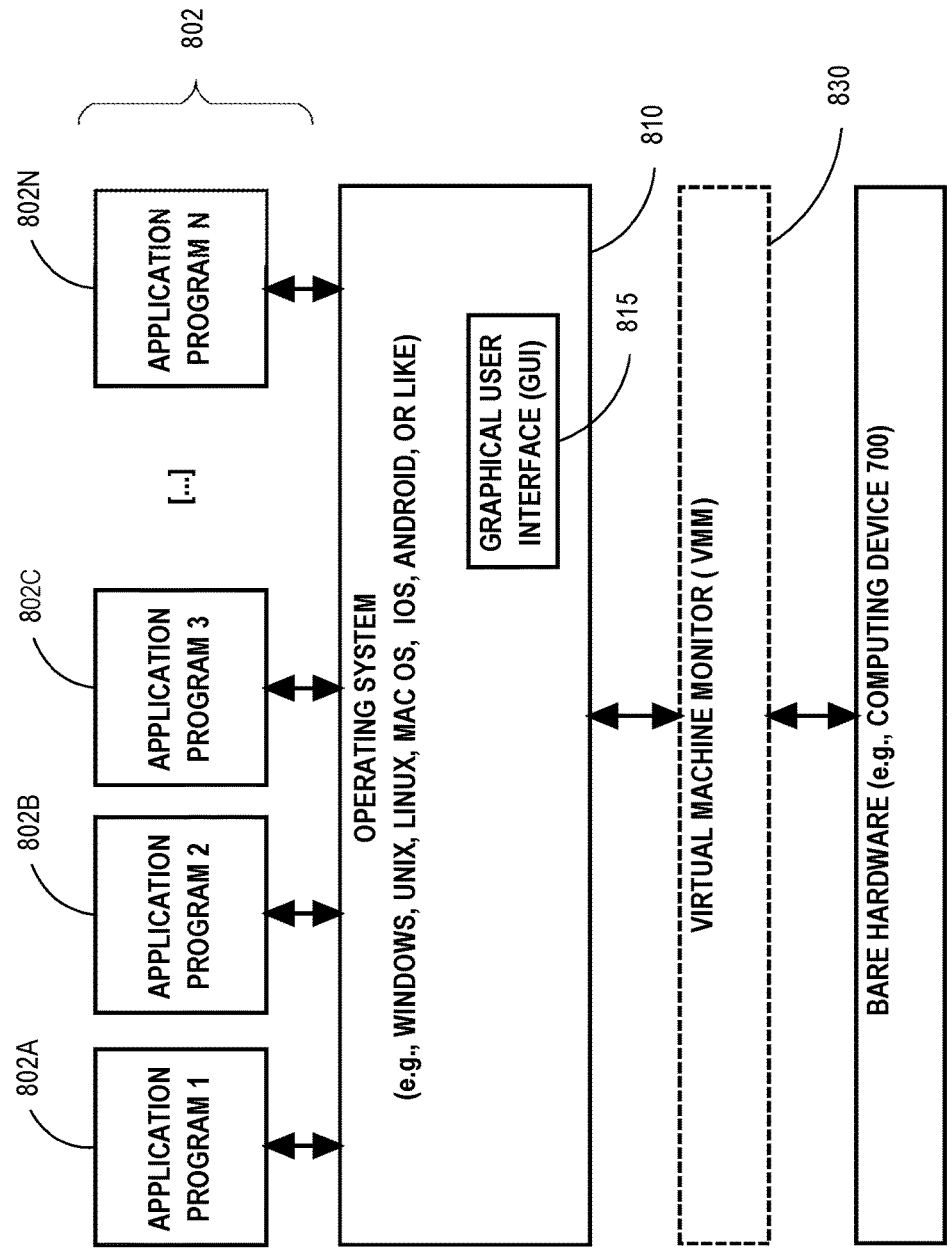
FIG. 8 is a block diagram that illustrates a basic software system that may be employed for controlling the operation of a computing system.

FIG. 8 is a block diagram of a basic software system 800 that may be employed for controlling the operation of computing system 700. Software system 800 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 800 is provided for directing the operation of computing system 700. Software system 800, which may be stored in system memory (RAM) 706 and on fixed storage (e.g., hard disk or flash memory) 710, includes a kernel or operating system (OS) 810.

The OS 810 manages low-level aspects of computer operation, including managing execution of processes, memory allocation, file input and output (I/O), and device I/O. One or more application programs, represented as 802A, 802B, 802C . . . 802N, may be "loaded" (e.g., transferred from fixed storage 710 into memory 706) for execution by the system 800. The applications or other software intended for use on computer system 700 may also be stored as a set of downloadable computer-executable instructions, for example, for downloading and installation from an Internet location (e.g., a Web server, an app store, or other online service).

Software system 800 includes a graphical user interface (GUI) 815, for receiving user commands and data in a graphical (e.g., "point-and-click" or "touch gesture") fashion. These inputs, in turn, may be acted upon by the system 800 in accordance with instructions from operating system 810 and/or application(s) 802. The GUI 815 also serves to display the results of operation from the OS 810 and application(s) 802, whereupon the user may supply additional inputs or terminate the session (e.g., log off).

OS 810 can execute directly on the bare hardware 820 (e.g., processor(s) 704) of computer system 700. Alternatively, a hypervisor or virtual machine monitor (VMM) 830 may be interposed between the bare hardware 820 and the OS 810. In this configuration, VMM 830 acts as a software "cushion" or virtualization layer between the OS 810 and the bare hardware 820 of the computer system 700.

VMM 830 instantiates and runs one or more virtual machine instances ("guest machines"). Each guest machine comprises a "guest" operating system, such as OS 810, and one or more applications, such as application(s) 802, designed to execute on the guest operating system. The VMM 830 presents the guest operating systems with a virtual operating platform and manages the execution of the guest operating systems.

In some instances, the VMM 830 may allow a guest operating system to run as if it is running on the bare hardware 820 of computer system 800 directly. In these instances, the same version of the guest operating system configured to execute on the bare hardware 820 directly may also execute on VMM 830 without modification or reconfiguration. In other words, VMM 830 may provide full hardware and CPU virtualization to a guest operating system in some instances.

In other instances, a guest operating system may be specially designed or configured to execute on VMM 830 for efficiency. In these instances, the guest operating system is "aware" that it executes on a virtual machine monitor. In other words, VMM 830 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

Cloud Computing

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   each storage cell of a plurality of storage cells persisting a respective subset of hierarchical data objects of a plurality of hierarchical data objects that reside in a database of a database management system (DBMS) that is connected to the plurality of storage cells, wherein said persisting the respective subset of hierarchical data objects comprises at least one selected from the group consisting of:
      persisting the respective subset of hierarchical data objects in a relational database, and
      persisting the respective subset of hierarchical data objects in a binary format;
   a particular storage cell of the plurality of storage cells performing:
      automatically deciding, based on a usage statistic of the particular storage cell, to create a particular storage-side index-that maps each item of a respective plurality of items to one or more locations where the item occurs in one or more hierarchical data objects of the respective subset of hierarchical data objects persisted by the particular storage cell, and
      storing, in random access memory (RAM) in said particular storage cell, the particular storage-side index, wherein the particular storage-side index is not stored outside of the RAM in said particular storage cell;
   executing, based on a plurality of storage-side indices in the RAM of the plurality of storage cells, including the particular storage-side index, a data access request from the DBMS.

2. The method of claim 1 further comprising, based on usage statistics, dynamically adding or removing a particular item to the particular storage-side index in the RAM in the particular storage cell of the plurality of storage cells.

3. The method of claim 1 further comprising, based on usage statistics, the particular storage cell of the plurality of storage cells dynamically adding or removing at least one selected from the group consisting of:
   a B+ tree functional index,
   a JSON search index that comprises: path-subsetting and/or asynchronous mode, and
   a functional spatial index.

4. The method of claim 1 wherein:
   the data access request comprises at least one expression of a plurality of expressions;
   the particular storage-side index of the plurality of storage-side indices comprises a hash index that comprises a hash value for each expression of the plurality of expressions;
   said executing the data access request comprises using, based on the at least one expression, the hash index.

5. The method of claim 1 further comprising the particular storage cell creating, in the RAM in the particular storage cell, a storage-side index and/or an IMCU in response to a threshold frequency of at least one selected from the group consisting of:
   equality path queries and/or range path queries exceeding a threshold selectivity,
   queries not exceeding the threshold selectivity,
   full-text searches, and
   spatial queries.

6. The method of claim 1 wherein:
   the plurality of storage cells comprises a first storage cell and a second storage cell;
   the respective subset of hierarchical data objects of the first storage cell comprises the respective subset of hierarchical data objects of the second storage cell;
   executing the data access request comprises selecting, based on the data access request, only one storage cell of the first storage cell and the second storage cell to execute the data access request.

7. The method of claim 6 wherein said selecting said only one storage cell comprises dynamically:
   selecting the first storage cell when the DBMS sends the data access request in response to an online analytical processing (OLAP) query;
   selecting the second storage cell when the DBMS sends the data access request in response to an online transaction processing (OLTP) write.

8. The method of claim 1 wherein:
said respective plurality of items comprises a plurality of item datatypes;
said automatically deciding to create said particular storage-side index comprises selecting a kind of storage-side index of a plurality of kinds of storage-side indices based on a datatype of the item.

9. The method of claim 1 wherein said executing the data access request comprises at least one selected from the group consisting of:
obtaining identifiers of at least one of the respective subset of hierarchical data objects from the RAM of the plurality of storage cells,
updating at least one of the respective subset of hierarchical data objects, and
returning, in a binary format to a client, at least one hierarchical data object of the plurality of hierarchical data objects.

10. The method of claim 1 wherein at least one selected from the group consisting of:
the data access request comprises a path query,
said executing the data access request comprises using a hierarchy index that indicates containment relationships amongst the respective plurality of items, and
the plurality of hierarchical data objects comprises at least one selected from the group consisting of: a document, JavaScript object notation (JSON), extensible markup language (XML), and key-value pairs.

11. The method of claim 1 further comprising the DBMS generating a relational view in said database that is based on the plurality of hierarchical data objects and comprises at least one selected from the group consisting of: statement refreshing and materialization.

12. One or more non-transitory computer-readable media storing instruction that, when executed by one or more processors, cause:
each storage cell of a plurality of storage cells persisting a respective subset of hierarchical data objects of a plurality of hierarchical data objects that reside in a database of a database management system (DBMS) that is connected to the plurality of storage cells, wherein said persisting the respective subset of hierarchical data objects comprises at least one selected from the group consisting of:
persisting the respective subset of hierarchical data objects in a relational database, and
persisting the respective subset of hierarchical data objects in a binary format;
a particular storage cell of the plurality of storage cells performing:
automatically deciding, based on a usage statistic of the particular storage cell, to create a particular storage-side index that maps each item of a respective plurality of items to one or more locations where the item occurs in one or more hierarchical data objects of the respective subset of hierarchical data objects persisted by the particular storage cell, and
storing, in random access memory (RAM) in said particular storage cell, the particular storage-side index, wherein the particular storage-side index is not stored outside of the RAM in said particular storage cell;
executing, based on a plurality of storage-side indices in the RAM of the plurality of storage cells, including the particular storage-side index, a data access request from the DBMS.

13. The one or more non-transitory computer-readable media of claim 12 wherein the instructions further cause, based on usage statistics, dynamically adding or removing a particular item to the particular storage-side index in the RAM in the particular storage cell of the plurality of storage cells.

14. The one or more non-transitory computer-readable media of claim 12 wherein the instructions further cause, based on usage statistics, the particular storage cell of the plurality of storage cells dynamically adding or removing at least one selected from the group consisting of:
a B+ tree functional index,
a JSON search index that comprises: path-subsetting and/or asynchronous mode, and
a functional spatial index.

15. The one or more non-transitory computer-readable media of claim 12 wherein the instructions further cause the particular storage cell creating a storage-side index and/or an IMCU in response to a threshold frequency of at least one selected from the group consisting of:
equality path queries and/or range path queries exceeding a threshold selectivity,
queries not exceeding the threshold selectivity,
full-text searches, and
spatial queries.

16. The one or more non-transitory computer-readable media of claim 12 wherein:
the plurality of storage cells comprises a first storage cell and a second storage cell;
the respective subset of hierarchical data objects of the first storage cell comprises the respective subset of hierarchical data objects of the second storage cell;
executing the data access request comprises selecting, based on the data access request, only one storage cell of the first storage cell and the second storage cell to execute the data access request.

17. The one or more non-transitory computer-readable media of claim 16 wherein said selecting said only one storage cell comprises dynamically:
selecting the first storage cell when the DBMS sends the data access request in response to an online analytical processing (OLAP) query;
selecting the second storage cell when the DBMS sends the data access request in response to an online transaction processing (OLTP) write.

18. The one or more non-transitory computer-readable media of claim 12 wherein:
said respective plurality of items comprises a plurality of item datatypes;
said automatically deciding to create said particular storage-side index comprises selecting a kind of storage-side index of a plurality of kinds of storage-side indices based on a datatype of the item.

* * * * *

UNITED STATES PATENT AND TRADEMARK OFFICE
CERTIFICATE OF CORRECTION

PATENT NO. : 11,157,478 B2
APPLICATION NO. : 16/690817
DATED : October 26, 2021
INVENTOR(S) : Liu et al.

Page 1 of 2

It is certified that error appears in the above-identified patent and that said Letters Patent is hereby corrected as shown below:

On the Title Page

On page 3, Column 2, Item (56) under Other Publications, Line 9, delete "US" and insert -- U.S. --, therefor.

On page 3, Column 2, Item (56) under Other Publications, Line 43, delete ""Fundatmentals" and insert -- "Fundamentals --, therefor.

On page 3, Column 2, Item (56) under Other Publications, Line 57, delete "Asurvery", Knowlesge-" and insert -- A survey", Knowledge- --, therefor.

On page 4, Column 1, Item (56) under Other Publications, Line 23, delete "-Grammer" and insert -- -Grammar --, therefor.

On page 4, Column 1, Item (56) under Other Publications, Line 34, delete "Largedata Bases," and insert -- Large Data Bases, --, therefor.

On page 4, Column 2, Item (56) under Other Publications, Line 25, delete "Yorkm" and insert -- York --, therefor.

In the Specification

In Column 6, Line 17, delete "that that" and insert -- that --, therefor.

In Column 11, Line 41, delete "2015-00395 87A1)," and insert -- 2015-0039587 A1), --, therefor.

In Column 17, Line 20, delete "and or" and insert -- and/or --, therefor.

In Column 18, Lines 10-11, delete "For example, storage-side index 541 may".

Signed and Sealed this
Eighth Day of March, 2022

Drew Hirshfeld
*Performing the Functions and Duties of the
Under Secretary of Commerce for Intellectual Property and
Director of the United States Patent and Trademark Office*

CERTIFICATE OF CORRECTION (continued)
U.S. Pat. No. 11,157,478 B2

In the Claims

In Column 24, Line 3, in Claim 1, delete "index-that" and insert -- index that --, therefor.